US011100470B2

(12) United States Patent
Defusco et al.

(10) Patent No.: US 11,100,470 B2
(45) Date of Patent: Aug. 24, 2021

(54) SYSTEM AND METHOD FOR MANAGING PROJECTS

(71) Applicant: DELTEK, INC., Herndon, VA (US)

(72) Inventors: Scott A. Defusco, Haymarket, VA (US); Jeffrey David Eckerle, Eagan, MN (US); Lisa Anne Rabideau, Northborough, MA (US); Benjamin Joe Rossi, Potomac Falls, VA (US); Mark J. Nutter, Woodbury, MN (US)

(73) Assignee: DELTEK, INC., Herndon, VA (US)

( * ) Notice: Subject to any disclaimer, the term of this patent is extended or adjusted under 35 U.S.C. 154(b) by 482 days.

(21) Appl. No.: 15/671,777

(22) Filed: Aug. 8, 2017

(65) Prior Publication Data

US 2017/0337517 A1 Nov. 23, 2017

Related U.S. Application Data

(63) Continuation of application No. 15/064,934, filed on Mar. 9, 2016, now Pat. No. 9,785,915, which is a (Continued)

(51) Int. Cl.
*G06Q 10/10* (2012.01)
*G06F 16/44* (2019.01)
(Continued)

(52) U.S. Cl.
CPC ......... *G06Q 10/103* (2013.01); *G06F 16/447* (2019.01); *G06F 40/186* (2020.01); (Continued)

(58) Field of Classification Search
CPC .... G06F 16/447; G06F 17/248; G06F 40/186; G06Q 10/103; G06Q 10/063118; G06Q 10/06313; G06Q 10/1093
See application file for complete search history.

(56) References Cited

U.S. PATENT DOCUMENTS 6,064,977 A 5/2000 Haverstock et al.
6,678,698 B2 * 1/2004 Fredell .................. G06Q 10/06
707/608

(Continued)

FOREIGN PATENT DOCUMENTS

KR 2003-0079837 10/2003

OTHER PUBLICATIONS

International Search Report issued in International Application No. PCT/US2012/043980, dated Jan. 7, 2013.
(Continued)

*Primary Examiner* — Jay A Morrison
(74) *Attorney, Agent, or Firm* — DLA Piper LLP (US)

(57) ABSTRACT

A method and system for managing a project. The method and system comprise accepting at least two project templates from a database, wherein the project database contains personal project templates and work project templates categorized by type of project. A start date and/or an end date for each project template may be accepted. Information related to each project template may be automatically generated. The information related to all project templates may be aggregated and a user may access the information related to all project templates from one user interface.

20 Claims, 33 Drawing Sheets

Related U.S. Application Data continuation of application No. 13/532,098, filed on Jun. 25, 2012, now Pat. No. 9,317,825.

(60) Provisional application No. 61/501,606, filed on Jun. 27, 2011.

(51) Int. Cl.
*G06Q 10/06* (2012.01)
*G06F 40/186* (2020.01)

(52) U.S. Cl.
CPC ............. *G06Q 10/06313* (2013.01); *G06Q 10/063118* (2013.01); *G06Q 10/1093* (2013.01)

(56) References Cited

U.S. PATENT DOCUMENTS

| | | | |
|---|---|---|---|
| 7,039,480 | B2 | 5/2006 | Ooshima et al. |
| 7,467,355 | B1 | 12/2008 | Zukowski et al. |
| 7,493,591 | B2 | 2/2009 | Charisius et al. |
| 7,657,454 | B2 | 2/2010 | Kayahara et al. |
| 7,676,542 | B2 | 3/2010 | Moser et al. |
| 7,698,639 | B2 | 4/2010 | Kamdar et al. |
| 7,801,780 | B1 | 9/2010 | Nearhood |
| 7,818,144 | B2 | 10/2010 | Delargy |
| 7,818,372 | B1 | 10/2010 | Cutrell et al. |
| 7,822,747 | B2 | 10/2010 | Clark et al. |
| 7,822,808 | B2 | 10/2010 | Caplan et al. |
| 7,827,050 | B2 | 11/2010 | Bangel et al. |
| 7,908,647 | B1 | 3/2011 | Polis et al. |
| 7,949,617 | B1 | 5/2011 | Higgins et al. |
| 8,024,212 | B1 | 9/2011 | McCroby |
| 8,082,308 | B1 | 12/2011 | Filev |
| 8,479,087 | B2 | 7/2013 | Swineford et al. |
| 8,645,178 | B2 | 2/2014 | Nguyen et al. |
| 8,677,229 | B2 | 3/2014 | McAfee et al. |
| 8,732,581 | B2 | 5/2014 | Poling et al. |
| 8,751,572 | B1 | 6/2014 | Behforooz et al. |
| 8,949,179 | B2 | 2/2015 | Besen et al. |
| 9,239,846 | B2 | 1/2016 | Besen et al. |
| 9,244,934 | B2 | 1/2016 | Besen et al. |
| 2002/0032592 | A1 | 3/2002 | Krasnick |
| 2002/0082895 | A1 | 6/2002 | Budka et al. |
| 2002/0169659 | A1 | 11/2002 | Bollapragada |
| 2003/0004763 | A1 | 1/2003 | LaBlanc et al. |
| 2005/0165631 | A1 | 7/2005 | Horvitz |
| 2005/0216111 | A1 | 9/2005 | Ooshima et al. |
| 2006/0165123 | A1 | 7/2006 | Jerrard-Dunne et al. |
| 2006/0195781 | A1 | 8/2006 | Jatavallabha et al. |
| 2007/0038499 | A1 | 2/2007 | Margulies et al. |
| 2007/0180375 | A1 | 8/2007 | Gittelman et al. |
| 2007/0299713 | A1 | 12/2007 | Macbeth |
| 2008/0130525 | A1 | 6/2008 | Jansen |
| 2008/0189609 | A1 | 8/2008 | Larson et al. |
| 2009/0198538 | A1* | 8/2009 | Gupta ............. G06Q 30/02 705/14.64 |
| 2010/0280962 | A1 | 11/2010 | Chan |
| 2010/0324948 | A1 | 12/2010 | Kumar et al. |
| 2010/0332278 | A1 | 12/2010 | Stern et al. |
| 2011/0016426 | A1 | 1/2011 | Grosz et al. |
| 2011/0030031 | A1 | 2/2011 | Lussier et al. |
| 2011/0035323 | A1 | 2/2011 | Hamilton et al. |
| 2011/0071899 | A1 | 3/2011 | Robertson |
| 2011/0125539 | A1 | 5/2011 | Bollapragada |
| 2011/0179045 | A1* | 7/2011 | Caldwell ............. G06Q 10/00 707/754 |
| 2011/0307816 | A9 | 12/2011 | Barnett |
| 2011/0320369 | A1 | 12/2011 | Harkin |
| 2012/0016805 | A1 | 1/2012 | Graupner et al. |

OTHER PUBLICATIONS

Written Opinion issued in International Application No. PCT/US2012/043980, dated Jan. 7, 2013.
English language abstract of KR 2003-0079837, published Oct. 10, 2003.
Podio.com, printed from web.archive.org, archived Jul. 15, 2011 (36 pages).
Huddle.com, printed from web.archive.org, archived Jun. 12, 2011 (70 pages).
Manymoon.com, printed from web.archive.org, archived Jul. 23, 2011 (3 pages).
"Project Management Templates for Project KickStart and Webplanner", printed from http://www.projectkickstart.com/downloads/prxdownload.cfm, on Oct. 21, 2014 (5 pages).
"Teamwork Live", printed from http://www.teamworklive.com/Features.htm, on Oct. 21, 2014 (14 pages).
"VIP Task Manager" printed from http://www.vip-qualitysoft.com, on Oct. 21, 2014 (2 pages).
"Project Management Templates", printed from http://www.method123.com, on Oct. 21, 2014 (3 pages).
"Online Tool for Project Management, Collaboration and Knowledge Sharing", printed from http://www.comindwork.com/features-to-do-lists, on Oct. 21, 2014 (7 pages).
"Plan and Progress Tracker", printed from http://www.4abetterbusiness.com/tracker.htm, on Oct. 21, 2014 (4 pages).
"Project management Area", printed from http://www.conceptdraw.com/solutions_pm.php, on Oct. 21, 2014 (8 pages).
"Salesforce.com", printed from web.archive.org, archived Jun. 24, 2011 (3 pages).
"Chatter.com", printed from web.archive.org, archived May 8, 2011 (5 pages).
"Producteev.com", printed from web.archive.org, archived Jun. 25, 2011 (2 pages).
"Getflow.com", printed from web.archive.org, archived Jun. 6, 2011 (9 pages).
Dustdar, "Caramba—a process-aware collaboration system supporting ad hoc and collaborative processes in virtual terms," Distributed and Parallel Databases 15, pp. 45-46, 2004.
"Angieslist.com", printed from web.archive.org archived Jun. 23, 2012 (16 pages).
"Asana.com", printed from web.archive.org archived Jun. 21, 2012 (31 pages).
"Basecamp.com", printed from web.archive.org archived Jun. 23, 2012 (11 pages).
"metalabdesign.com", printed from web.archive.org archived Jun. 20, 2012 (18 pages).
"www.google.com/+/learnmore/circles/", printed from web.archive.org archived Feb. 8, 2013 (43 pages).
U.S. Appl. No. 13/532,098, 2013-0024452, filed Jan. 24, 2013, U.S. Pat. No. 9,317,825.
U.S. Appl. No. 15/064,934, 2016-0189104, filed Jun. 30, 2016, U.S. Pat. No. 9,785,915.

* cited by examiner

Project Management
System Ecosystem

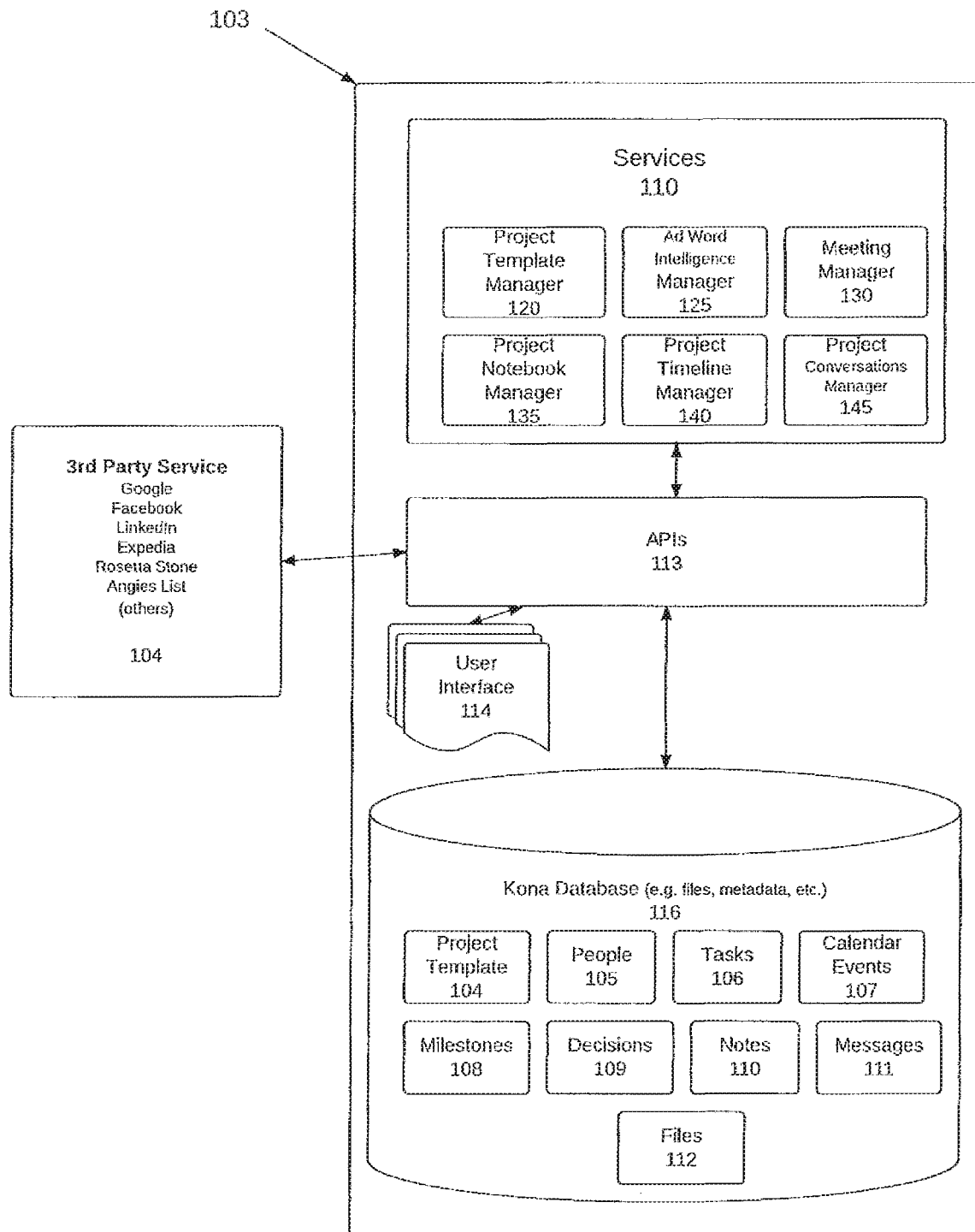

Sponsored Project Templates

Meeting Manager

Project Notebook

Project Timeline

Project Conversations

FIGURE 11

Kona Notebook
Wireframe 2

FIGURE 30

The Project Template Manager allows you to search, browse, and download templates that are developed by 3rd parties using the Project Template Manager platform. Some of these templates will be "sponsored templates" from 3rd parties that will include predefined tasks, calendar events, files, people resources as well as business logic and dynamic links to 3rd party sites, services, and resources.

Project Templates

[wedding]

Type

- Business
- Building a Home
- Buying/Selling a Home
- Diet and Health
- Education
- Event Planning
- Family Activities
- Fundraisers
- Home Improvement
- Home Maintenance
- Learn a Language
- Planning for College
- Trip Planning

Wedding
Planning your wedding should be fun!
Let TheKnot.com guide you through this exciting process with our wedding planning template
★★★★☆ [Download]

Wedding
Planning your wedding should be fun!
Let TheKnot.com guide you through this exciting process with our wedding planning template
★★★★☆ [Download]

Wedding
Planning your wedding should be fun!
Let TheKnot.com guide you through this exciting process with our wedding planning template
★★★★☆ [Download]

Liam Brooks
Completed 5 tasks today!
[Create New]

MY PROJECTS
- Inbox

Work
- New Service Offering
- Company Rebranding
- Annual Talent Manageme...
- Winter Street Park Personal
- U6 Soccer Team
- Town Food Pantry

[Add New]

Showing 5 of 25 projects

PEOPLE I'M WORKING WITH

Showing 7 most active in your network

US 11,100,470 B2

SYSTEM AND METHOD FOR MANAGING PROJECTS

CROSS-REFERENCE TO RELATED APPLICATIONS

This application is a Continuation of U.S. patent application Ser. No. 15/064,934 filed Mach 9, 2016, which is a Continuation of U.S. patent application Ser. No. 13/532,098 filed Jun. 25, 2012, which claims the benefit of the filing date of U.S. Provisional Patent Application No. 61/501,606, filed Jun. 27, 2011. The entire content of these applications are herein incorporated by reference in their entireties.

A portion of the disclosure of this patent document contains material which is subject to (copyright or mask work) protection. The (copyright or mask work) owner has no objection to the facsimile reproduction by any one of the patent document or the patent disclosure, as it appears in the Patent and Trademark Office patent file or records, but otherwise reserves all (copyright or mask work) rights whatsoever.

BRIEF DESCRIPTION OF THE FIGURES

FIG. 1B illustrates details of the project management system, according to one embodiment.

FIGS. 8-32 are screen shots illustrating various features of the project management system, according to an embodiment.

DETAILED DESCRIPTION OF EMBODIMENTS

Figure 1A:
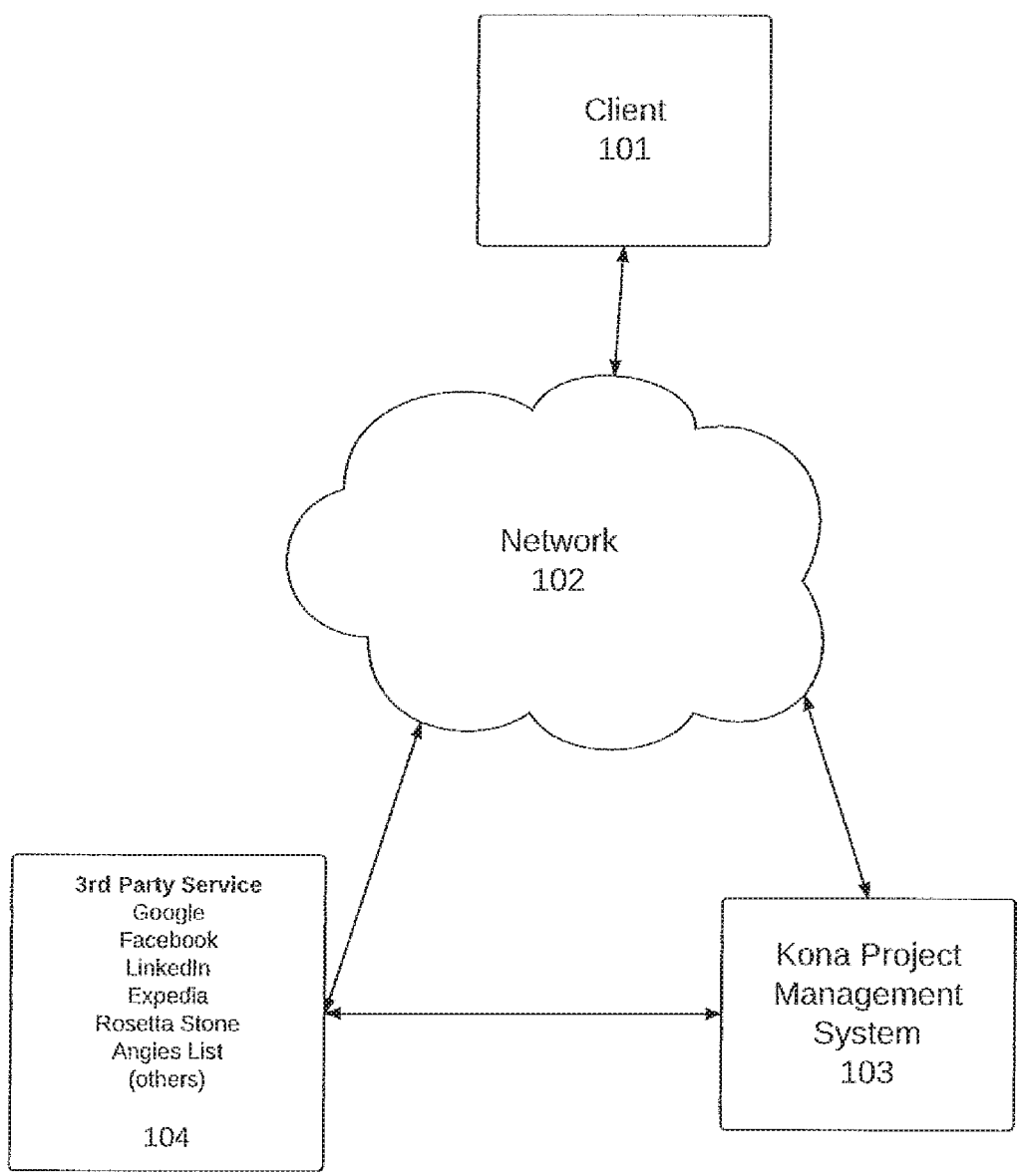
FIG. 1A illustrates a system for project management, according to one embodiment.

FIG. 1A illustrates a system 100, which can include, but is not limited to: a client 101 and a third party service 104 communicating with a server 116 over a network 102 utilizing a project management system 103. The project management system 103 may run utilizing server 116. The network 102 may comprise an Internet and/or an intranet. The client 101 and server 116 may comprise a computer. A computer may be any programmable machine capable of performing arithmetic and/or logical operations. In some embodiments, computers may comprise processors, memories, data storage devices, and/or other commonly known or novel components. These components may be connected physically or through network or wireless links. Computers may be referred to with terms that are commonly used by those of ordinary skill in the relevant arts, such as servers, PCs, mobile devices, and other terms. It will be understood by those of ordinary skill that those terms used herein are interchangeable, and any computer capable of performing the described functions may be used. For example, though the term "server" may appear in the following specification, the disclosed embodiments are not limited to servers. The third party service 104 can include, but is not limited to: Google, Facebook, Linked In, Expedia, Rosetta Stone, Angie's List, or any combination thereof. Those of ordinary skill in the art will see that any service can be utilized as a third party service 104.

Figure 8:
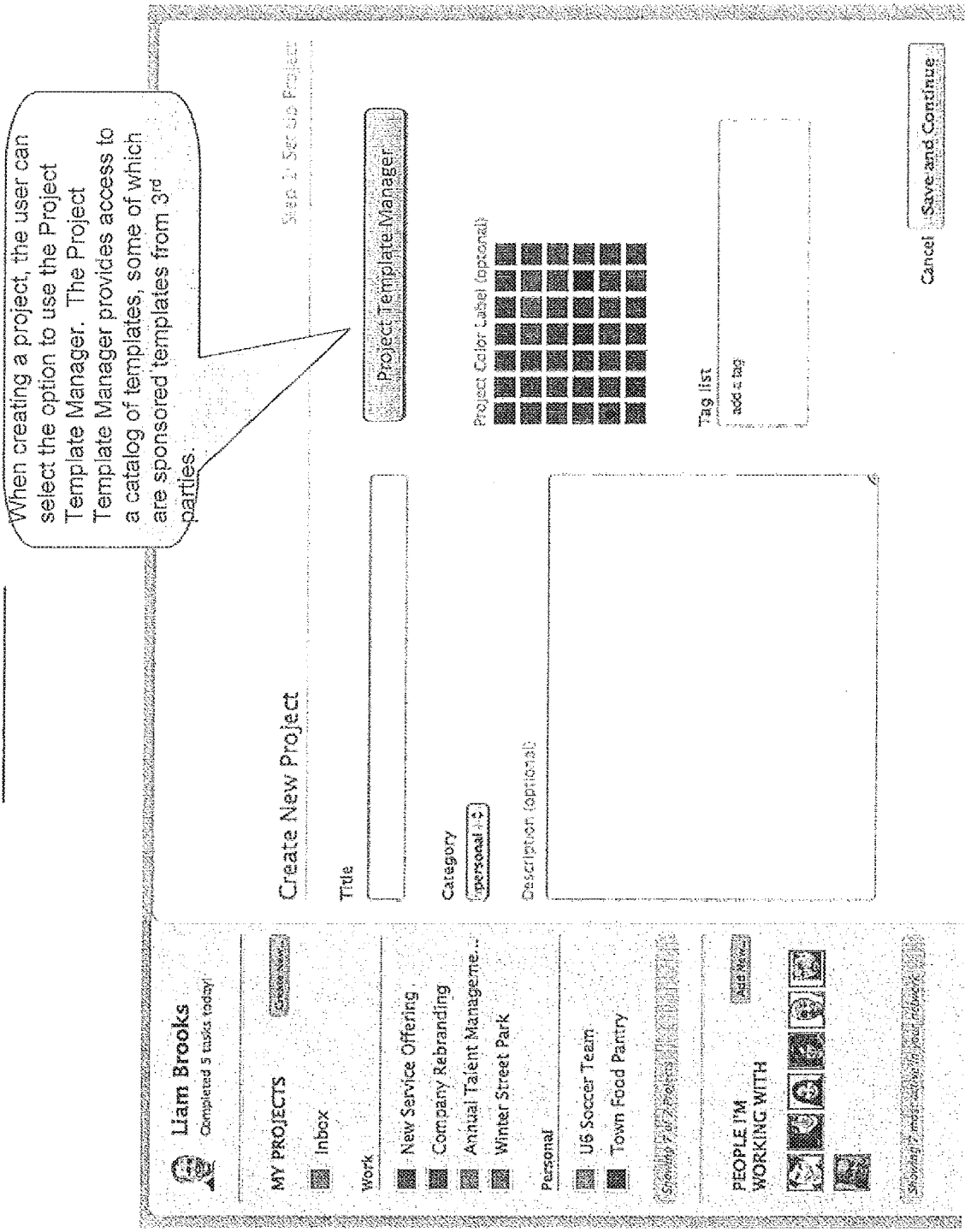

FIG. 1B sets forth details of the project management system 103, according to an embodiment. Available project templates 104 may be selected and displayed on a user home page using a user interface 114 which communicates with APIs 113. For example, a user home page is illustrated in FIG. 8. When creating a project, the user can select the option to use a project template manager 120. As shown in FIG. 30, the project template manager 120 may allow the user to search, browse, and download templates from a catalog of templates. Some of these templates may be "sponsored templates" from 3rd parties that may include predefined tasks, calendar events, files, people resources, and as business logic and dynamic links to third party sites, services, and resources. A project template 115 may be stored in database 116, or may be otherwise accessible by project management system 103. Project template 115 may comprise a pre-defined set of information and parameters.

Figure 9:
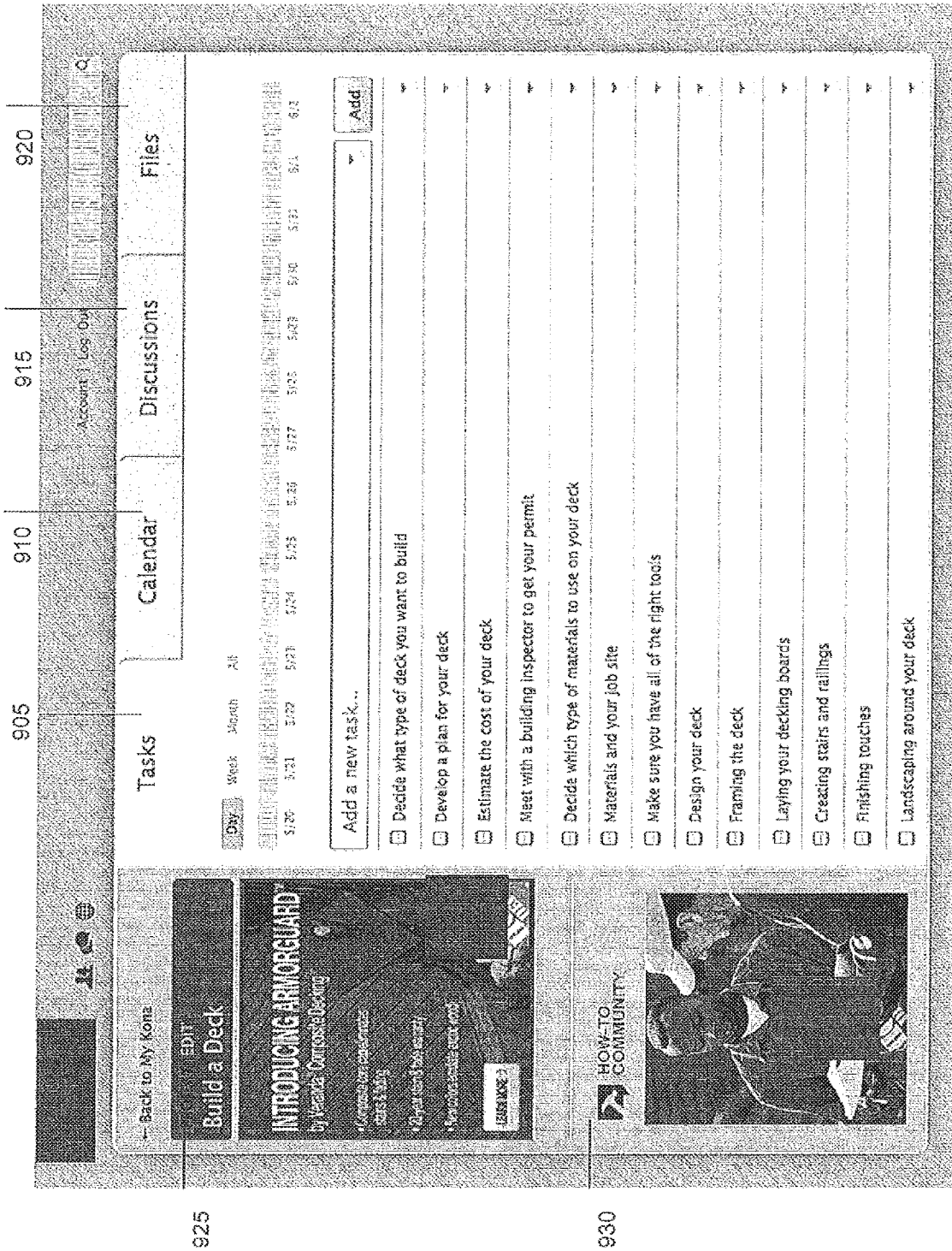

For example, the project template 115 may comprise: predefined tasks 106; predefined milestones 108; or pre-defined decisions 109; or any combination thereof. Tasks 106 may be a predefined list of items that need to be accomplished for a particular project. FIG. 9 provides an example list of tasks. Tasks may be further designated as milestones 108 or decisions 109. A milestone may be an important or major task. A decision may be a task that requires a decision to be made.

A project template 115 may also comprise: files 112, calendar events 107, notes 110, messages 111, or people 105, or any combination thereof. Each of these may be designated as related to one or more projects. Files 112 may be a text file, audio file, or video file, or any combination thereof that is designated as related to one or more projects. Calendar events 107 may be appointments on a calendar with a start and end time and can be recurring and include other team members. Notes 110 may be notes created by users. Messages 111 may be text, audio, or video, or any combination thereof that is communicated from one user to another. People 105 may be information (e.g., name, telephone number, email address, etc.) related to people with whom a user is associated.

Project management system 103 may also comprise various services 110, such as, but not limited to: project template manager 120; ad word intelligence manager 125; meeting manager 130; notebook manager 135; project timeline manager 140; or conversation manager 145; or any combination thereof.

Project template manager 120 may allow a user to create a project. A user may select a project and enter relevant start and/or end dates. Various tasks may then be generated. Project pages may also be generated with information related to the tasks, calendar events, discussion forums, links, files, etc. The user may then connect with other users. Details related to the project template manager 120 are described in process 200 of FIG. 2.

Ad word intelligence manager 125 may apply logic to words a user chooses in creating project, tasks, files, etc., in order to provide the user with meaningful advertisements related to what the user is trying to achieve. Details related to the ad word intelligence manager 125 are described in process 300 of FIG. 3.

Meeting manager 130 may allow a user to create a meeting agenda, schedule the meeting, manage the meeting as it is happening; or review a past meeting; or any combination thereof. Details related to the meeting manager 130 are described in more detail in process 400 of FIG. 4.

Notebook manager 135 may collect notes associated with a project. This may include personal notes taken by the user, as well as notes by others that have been shared with the user. A note may be text, graphics, audio, video, or a link, or any combination thereof that the user wishes to capture. The note may be marked as related to a project. The user may choose to share the note with one or more team members, or the user may choose to keep the note private. Details related to the notebook manager 135 are described in process 500 of FIG. 5.

Project timeline manager 140 may allow a user to create and/or adjust a timeline. Details related to the project timeline manager 140 are described in more detail in process 600 of FIG. 6.

Conversation manager 145 may manage communications (e.g., discussions) between one or more users. Messages may or may not be associated with projects. Messages may be saved as a note attached to a project. Users may participate in a message instantly within the project management system 103 if the users are online. Users may also reply to email alerts created from a message. Details related to the conversation manager 145 are described in more detail in process 600 of FIG. 6.

Figure 2:
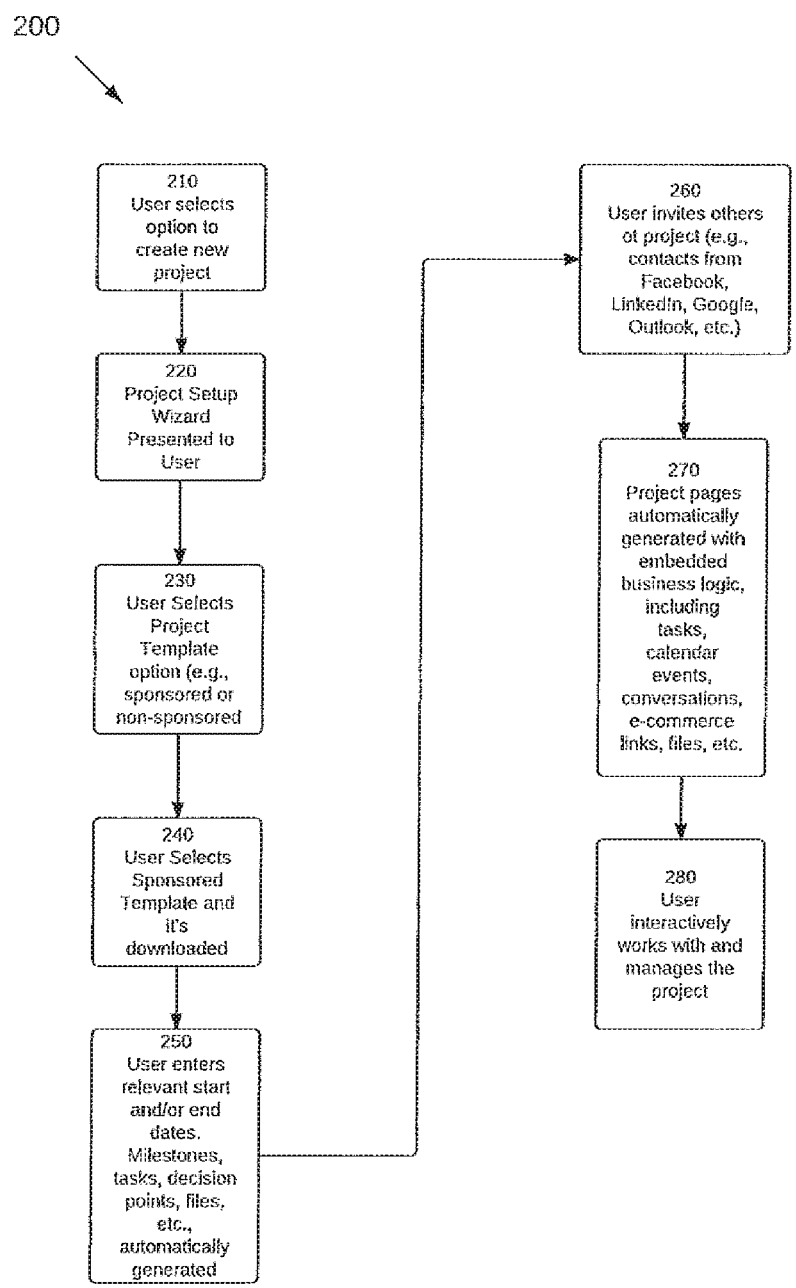
FIG. 2 is a flow diagram illustrating a method for utilizing project templates, according to one embodiment.
Figure 31:
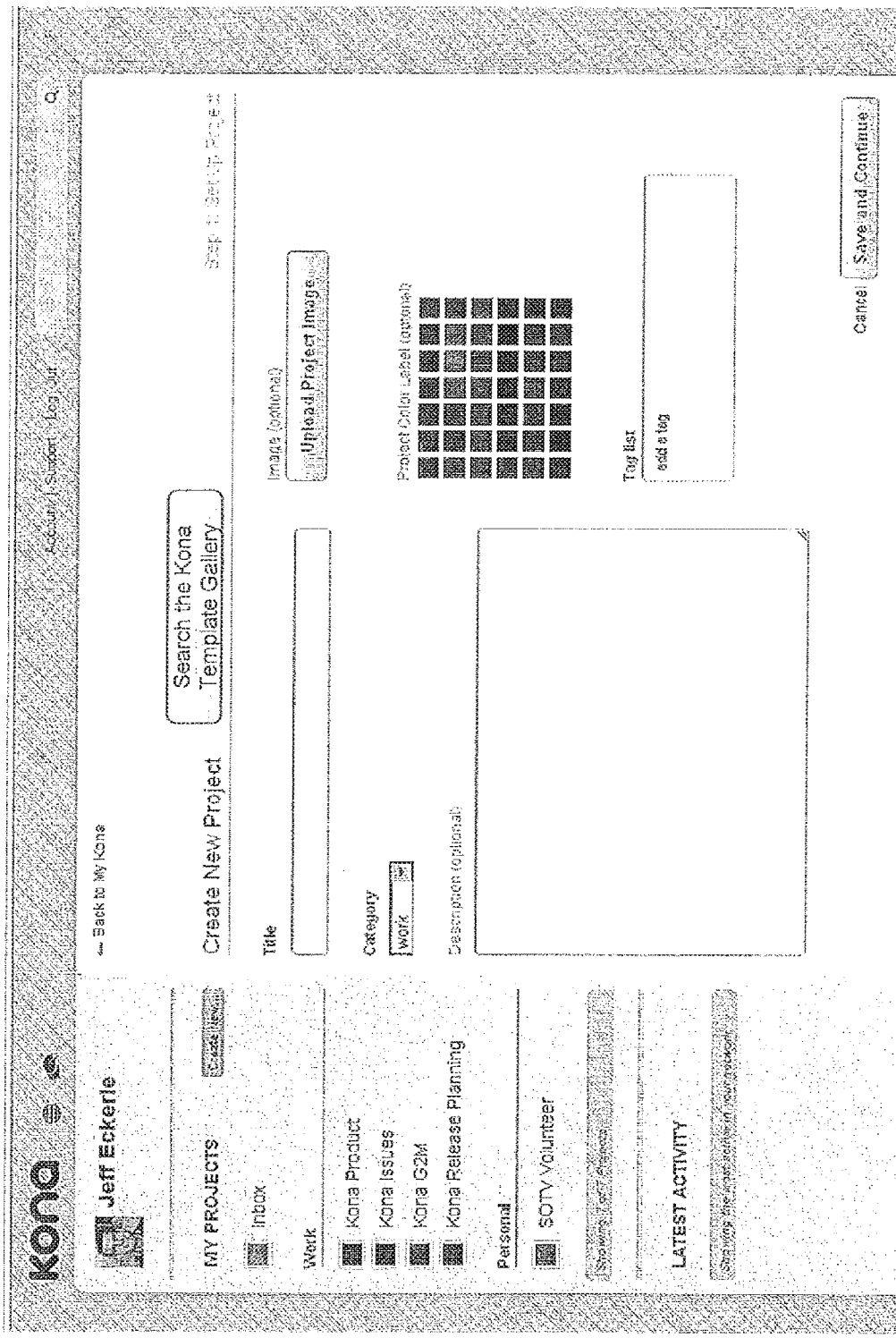
Figure 32:
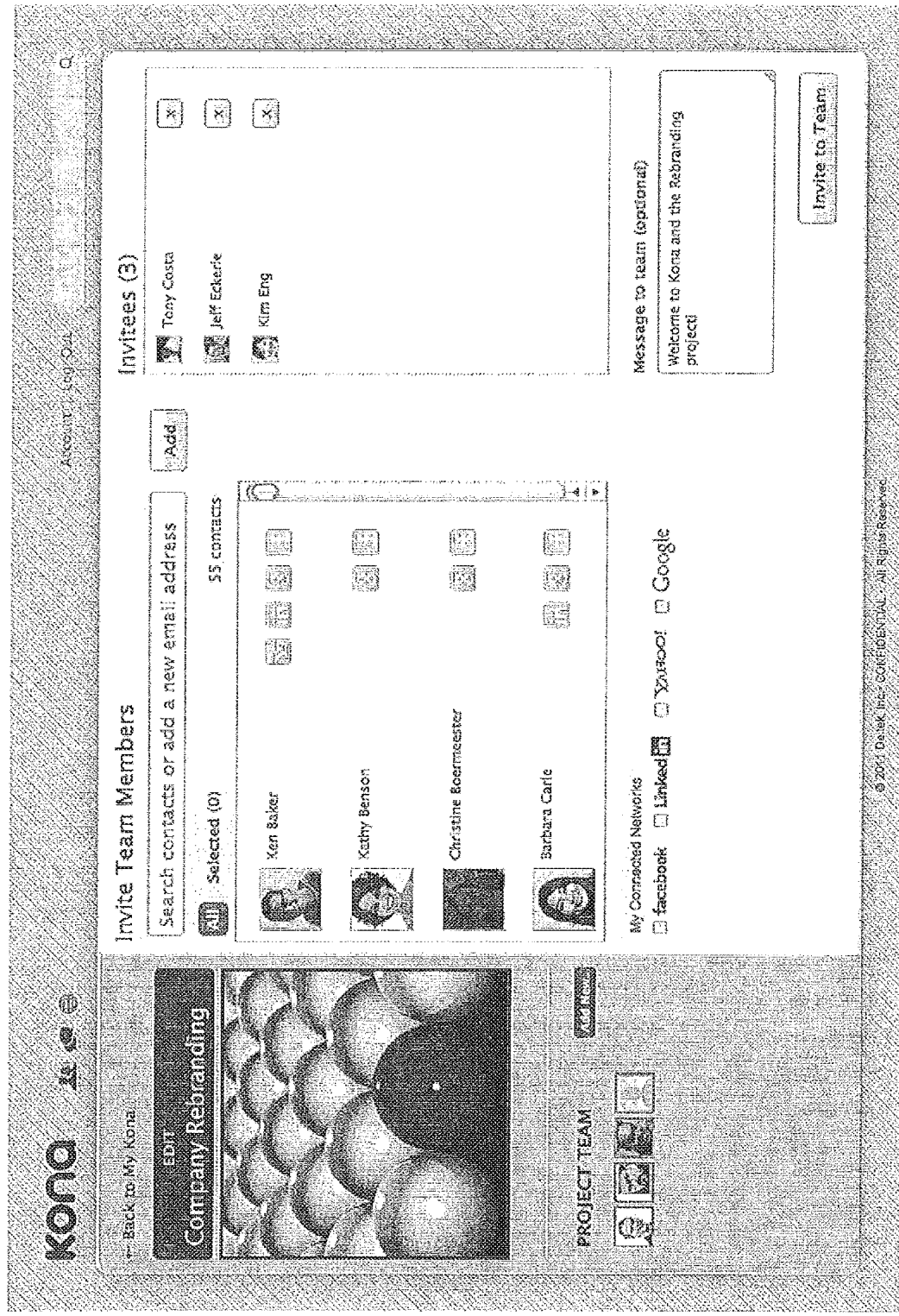

FIG. 2 is a flow diagram illustrating a method for utilizing project templates, according to one embodiment. In 210, a user may select an option to create a new project. In 220, a project setup wizard may be presented to the user. The project setup wizard may help a user create a new project. Referring to FIG. 31, the project details may be defined and a project image may be uploaded, and a project color may be chosen. As shown in FIG. 32, the project team may also be selected. In addition, the user may define initial project milestones. In one embodiment, rather than create a new project, a user may simply copy an existing project and/or components of the project (e.g., team). In other options, a user may browse a gallery of project templates and choose an already created project template. For example, in 230, a user may select a project template option. The project templates may be provided in a project gallery that may have a variety of home and work project templates that may be categorized by the type of project a user wishes to create. A user may select a sponsored project template or a non-sponsored project template. Sponsored project templates may be sponsored by an entity (e.g., business, government, non-profit, etc.) For example, Home Depot may sponsor templates related to home improvement. Non-sponsored project templates may be provided by a manager of the project management system 103, or by a third party and do not need to be tied to a specific entity. Project templates may connect experts or knowledge publishers with users that need to consume and leverage the knowledge.

In 240, the project template selected by the user may be downloaded. In 250, the user may enter relevant start and/or end dates. At this point, information may be automatically generated, such as, but not limited to: milestones, tasks, decision points, calendar information, or files, or any combination thereof. The start and end dates inputted by the user may define the duration of the template. Templates may create default time periods between milestones, tasks, and calendar events that occur in the template. The desired duration of the project then drives the spreading of actual dates used in the template. Some milestones and tasks in the template may have minimum and maximum durations between each other that override the linear spreading of tasks. In an example where the project is building a deck, the task to install the 4"×"4 pillars that will support the deck's platform can't be installed until seven days after the footings have been poured because the concrete needs to cure. This means that a user would not be able to enter an end date less than seven days for the entire project because of the required time difference between the two example tasks.

In 260, a user may invite others to the project. For example, contacts from Facebook, Linked In, Google, Outlook or any other social networking or other contact site, or any combination thereof, may be invited. In 270, project pages may be automatically generated with various elements, including, but not limited to: tasks, calendar events, discussion forums, e-commerce links, or files, or any combination thereof. The project pages are automatically generated using information entered when the template creator builds the template. The template creator may define the tasks, calendar events, discussion forums, e-commerce links, or files, or any combination thereof that are necessary for a user of the template to successfully accomplish the objective of the template. In 280, a user may actively manage the project by interacting with the tasks, calendar events, discussions, files, messages, etc. as the user participates on the user's project and monitors the progress of all activities (including ones the user does not participate in, but has access to).

FIG. 9 illustrates a user page for a project, according to one embodiment. A user can create the project by choosing a template for that project. A user can access a project user page from a user home page such as the one shown in FIG. 8. In 905, tasks for the project may be illustrated. Tasks for the user may be populated when the user downloads the template from the template database. Upon download, a new project for the user is created. All of the tasks, calendar events, discussion forums, e-commerce links, or files, or any combination thereof that have been pre-defined to be a part of the downloaded template may now be accessible by the user. These tasks may be predefined (e.g., by the template sponsor or another entity), and may be include other information, such as, but not limited to: helpful hints, knowledge, access to experts, or an e-commerce widget that allows the user to purchase related goods and services to help get the task done, or any combination thereof. In 910, a calendar (e.g., such as the one shown in FIG. 11) may be preconfigured to include events, tasks, or meetings that relate to getting the project done. When the project is set up, the calendar may be automatically set based on the user's current schedule and the time it takes to complete the tasks or events. As explained above, the start and end dates inputted by the user may define the duration of the template. Templates may utilize pre-defined default time periods between milestones, tasks, and calendar events that occur in the template. The desired duration of the project then drives the spreading of actual dates used in the template. Some milestones and tasks in the template may have minimum and maximum durations between each other that override the linear spreading of tasks.

In 915, discussions may be configured by the sponsor to have a predefined list of discussion groups that will provide users with the ability to chat online with experts, their peers in the program, or other members utilizing the project management system 103. For example, the user may chat with other people to get their thoughts on doing the project, or a piece of the project, that the user is doing. In 920, files may be preconfigured with any number of audio files, video files, documents, or web site links. The may allow the sponsor to provide information such as, but not limited to:

"how to" videos, links to online content, or document templates, or any combination thereof. In 925, advertising may be illustrated. As discussed in more detail below, the advertising may change based on the tasks the user is performing. In addition, sponsors may control the advertising. In 930, a "people I'm working with" area may be illustrated. This may be configured to plug in access to a sponsor's experts, other people participating in the project, or any other person, or any combination thereof.

Figure 10:
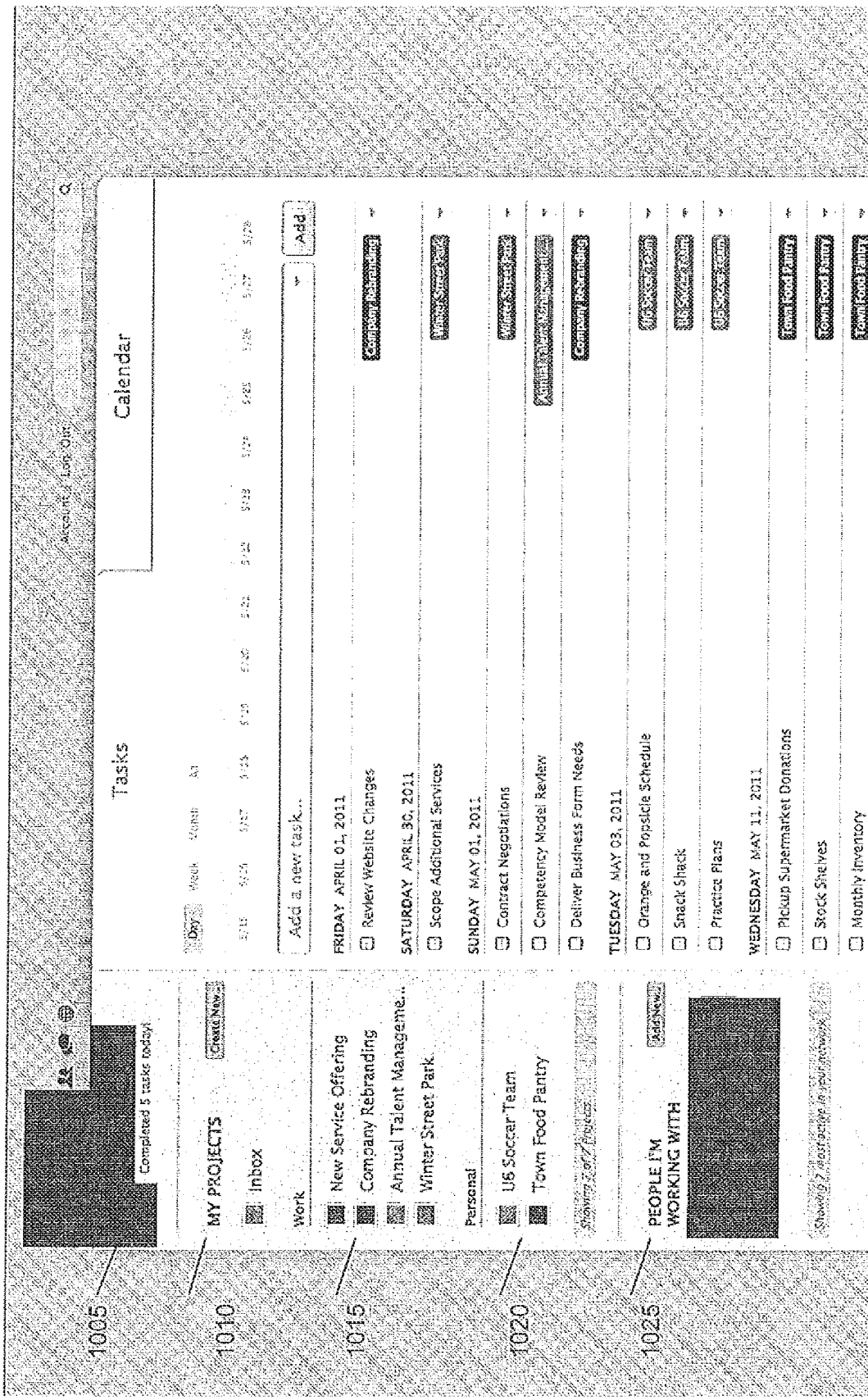

FIG. 10 illustrates another view of a user page, according to an embodiment. Note that whereas FIG. 9 is a project specific page showing the "Building a Deck" template, FIG. 10 is a user page which displays an aggregation of the entire user's personal and work projects. Detailed information for each project in FIG. 10 may be accessed by clicking on that project's name in the list. Referring to FIG. 10, the user's name and/or photo may be provided in 1005. In 1010, the user's projects may be listed, which may include the user's work projects (1015) and the user's personal projects (1020). In 1025, names and/or photos of people the user is working with may be shown.

As illustrated in FIG. 10, a user's project templates may be unified into one tool through their inclusion in the user's home page. This enables a user to manage projects from both his professional and personal lives in one place rather than seeking out information at various websites, applications, etc. For example, rather than accessing weightwatchers.com to manage his daily diet plan, accessing his son's Boy Scout troop's web page to see the calendar of events that must then be manually enter into his personal calendar, searching for the old email sent by his daughter's soccer coach to see the dates they are responsible for bringing the team's snacks, and accessing a share point site through his company's network to access a file for work, the user's home page may aggregate all of this information and makes it accessible in one place. When something changes, the update is pushed to the user automatically within the context of everything else. Additionally, knowledge and tools to help finish all types of projects are also integrated together to make completion of all the user's projects more convenient. In this way, the user may be more organized and productive, and collaborate more effectively with people with whom they work.

For example, if the user is planning a wedding, the user may have the ability to select from a series of wedding planning project templates that include information needed to start planning a wedding, such as, but not limited to: predefined milestones to guide the user through the various stages of the wedding planning process; predefined tasks that serve as the "to do" list for the user or other people involved in the wedding planning project; a predefined calendar of events for the wedding based on the timeframe and milestones for the user's wedding; predefined discussion forums and groups that allow the user to ask experts for specific wedding planning tasks or discuss elements of the wedding plan with experts or others who are going through or have gone through a similar project; a resource center where the user can access and share files, including documents, audio and/or video files, and links associating with the wedding planning project, or any combination thereof.

In addition, dynamic content may be pushed to the user (e.g., through widgets) to help the user plan the wedding. For example, if there is a predefined task related to choosing flowers, in addition to helpful hints on what level and type of flowers are typical for a wedding of a certain size, the template may include a widget that provides a top rated florist(s) in the area that specializes in wedding arrangements. The widget may also include the ability to have certain florists bid on the wedding based on criteria chosen through the widget. The winner may be notified, and the purchase may be completed online. Similar types of information and services may be provided for other aspects of the wedding, such as, but not limited to: invitations, favors, catering, etc.

As another example, if the user wishes to lose weight, the user may choose a template that is a 12-week program leading the user through the process of losing weight. The template may be provided by the sponsor for a cost, or provided by the sponsor for free with revenue provided to the sponsor or the content provider by advertising. The template may include, but is not limited to, the following: the ability for the user to chat with weight loss experts and/or peers that are also trying to lose weight; tasks including buying groceries, measuring body fat, weigh-ins; links to advice regarding various aspects of losing weight; the ability to allow the user to order items related to weight loss (e.g., meals, body fat calipers, exercise equipment, books, etc.) or see where items related to weight loss can be bought near the user's location; a calendar of pre-defined events (e.g., workout routines, shopping trips, planned meals, links to helpful hints, etc.); discussion forums for users (e.g., related to eating healthy, exercising, or generally losing weight); or files in a resource center with various web links, documents, and audio and/or video files; or any combination thereof.

As a further example, if the user wishes to sell a home, the template may include information associated with preparing the home for sale and walking the user through the entire sales process through contract signing. Tasks may include, but are not limited to: obtaining expert advice; asking agents questions; or choosing a home inspector (e.g., using Angie's list); or any combination thereof.

As an additional example, if the user wishes to do a home improvement project, the template may include information associated with the home improvement project. The information may include, but are not limited to: access to sponsored experts (e.g., Home Depot, Lowes), how to videos and web links; or a calendar of events for completing the home improvement project in the desired timeframe (this may include information related to whether the desired timeframe is realistic, with alternate timeframes suggested); or any combination thereof.

As another example, if the user wishes to conduct a fundraiser (e.g., for the Girl Scouts), the template may include information related to the specific fundraiser. The information may include, but is not limited to: access to fundraising experts; access to forums where the user may communicate with other volunteers associated with the fundraiser; a list of tasks required to complete the successful fundraiser; or a calendar of events for completing a successful fundraiser; or any combination thereof.

As an additional example, if the user wishes to do a business project, the template may include information related to the business project, such as responding to a certain type of audit. The information may include, but is not limited to: access to best practice experts (e.g., PWC, Deloitte, Bain) (e.g., an expert may sponsor a template); documents, links, etc. guiding the user through the audit, such as best practice information; tasks to help the user prepare for the audit; or the audit schedule; or any combination thereof.

Other examples of templates include, but are not limited to: learning a new language; planning a vacation; coaching a sports team; implementation services for a company; running a marathon; running a blood drive; or managing a political campaign; or any combination thereof.

As indicated earlier, the template may be provided by a sponsor. The sponsor may be an entity (e.g., a government, business, or non-profit; or the sponsor may be an individual (e.g., a celebrity).

Figure 3:
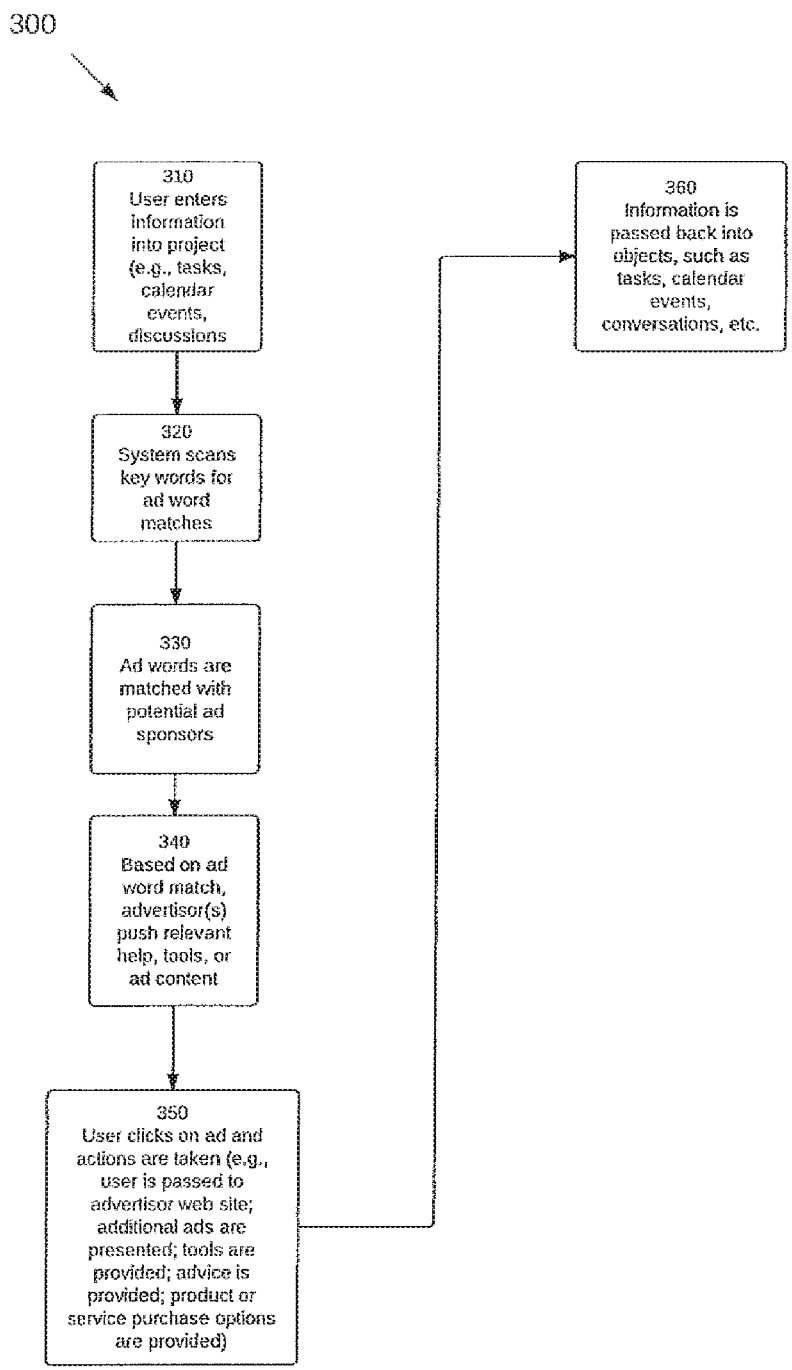
FIG. 3 illustrates a method for using project ad word intelligence, according to an embodiment.

FIG. 3 illustrates a method 300 for using project ad word intelligence, according to an embodiment. Using method 300, ad word intelligence may help connect the user with helpful information, services, and/or projects related to the goals the user is trying to achieve. Using method 300, as users work on tasks, manage their calendars, manage documents of files, or communicate with people, information related to what the user is doing at that point in time may be provided, allowing partners (e.g., advertisers) to guide specific content to the user in a timely and useful manner. In 310, a user may enter information into projects. The information may include, but is not limited to: tasks, calendar events, or discussions, or any combination thereof. In 320, the project management system 103 may scan the words entered by the user for key words that match ad words. In 330, ad words may be matched with potential ad sponsor. In 340, based on an ad word match, an advertiser may push relevant information to the user, including, but not limited to: help information, tools that may be useful for completing a project (e.g., information needed to complete a home renovation project), or ad content, or any combination thereof. In 350, the user may interact with the ad in, for example, the following ways: the user may be taken to the advertiser web site; additional ads may be presented to the user; tools that may be useful for completing a project may be provided to the user; advice may be provided to the user; or product and/or service purchase options may be provided to the user; or any combination thereof. In 360, information may be passed back to the user, such as, but not limited to: tasks, calendar events, or discussions, or any combination thereof.

Figure 11:
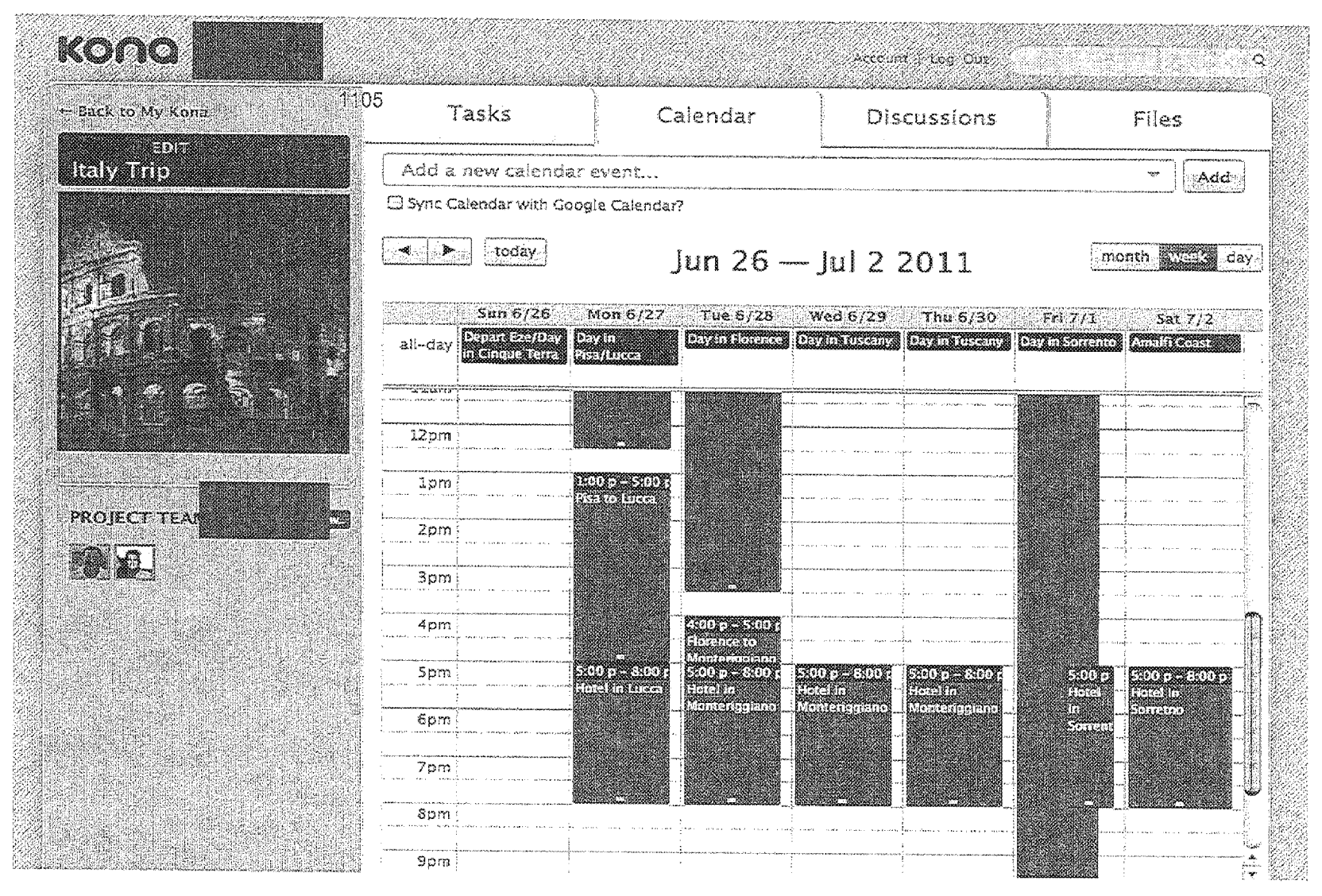

FIG. 11 is an example screen shot illustrating how ad word intelligence may be utilized, according to an embodiment. In this example, a user is interacting with the calendar feature of the project management system 103. As the user clicks on or types in information related to a project (e.g., trip to Italy), the project management system 103 may scan the task for key works and find the words "family", "vacation", and "Italy", and may then show in 1105 various ads related to the trip to Italy. For example, ads related to specific tasks or sub-projects (e.g., exact locations the user will visit) may be shown. In addition, information may be provided to the user (e.g., in a pop-up), asking the user if the user would like to access information related to their project, and specifically the part of the project the user is working on, as determined by the key words. For example, a pop-up may appear that asks the user if the user would like help: planning the itinerary, booking the flights, chatting with a travel expert, and chatting with other people that have traveled to Italy. The chatting may be done through a blog or chat room, as well as done over the phone. If the user decides he would like help planning the itinerary, a travel site may be shown that provides the user with a number of itineraries for different tours of Italy. After reviewing the various itineraries, the user may decide he wishes to start in Nice, France, and end in Rome. From the Italy Trip project the user created, the user may access the calendar features and enter an event for the first day of the trip entitled "Fly from Dulles to Nice" and for the last day entitled "Fly from Rome to Dulles". Because the dates for the trip and the arrival and departure cities are now known, a trip planning sponsor may suggest itineraries or tours that work well. In addition, airlines or travel agencies may suggest the best airfare for the dates and cities selected.

As the user starts adding in additional details (e.g., subtasks) related to the trip, through the ad intelligence, additional information may be provided to the user. For example, if the user ads in the location Lucca on the calendar, a partner(s) may be found to provide the user with options for hotels in Lucca. As the dates are already entered, much helpful information may be provided (e.g., ads, reviews, list of options available, etc.) through the partner. For example, a partner could push an ad to the user regarding an Italian language learning program. In some embodiment, a template could be offered to the user that had the actual Italian language learning program incorporated. The user may then book the hotel, and the details of the booking may be automatically added to the user's calendar. In addition, information about tours of Lucca, places to eat, etc. may be provided. The user may then book reservations for tours, rental equipment, reservations, etc., and this information may be automatically added to the user's calendar. Other users that may be going on the trip will also be able to access this information through many mediums (e.g., personal computers, mobile phones, etc.)

The ad word intelligence may be accomplished by working with third parties that wish to advertise to users through the project management system 103. The third parties may provide a catalog of search terms, that when entered through the project management system 103 by the user, will trigger context-specific advertising. For example, Weight Watchers may identify terms, such as "weight loss", "scale", "diet", etc. When users enter and/or use these terms when entering tasks, calendar events, online conversations, messages, and uploading files, etc., a match may be triggered with one of the words provided in the catalog of keywords provided by the third party. When a match is found, business logic may trigger the right advertising based on pre-defined conditions that the third party may identify. For example, the third party may identify a business rule that, when the terms "food" or "meal", and "planning" or "plan" are entered in a task, event, or discussion, an on-screen ad for deals on Weight Watchers meals the user can purchase in their local area is shown. In addition, through reading IP addresses or other techniques, the user's location may be determined so that the advertising can have local or regional context.

Figure 12:
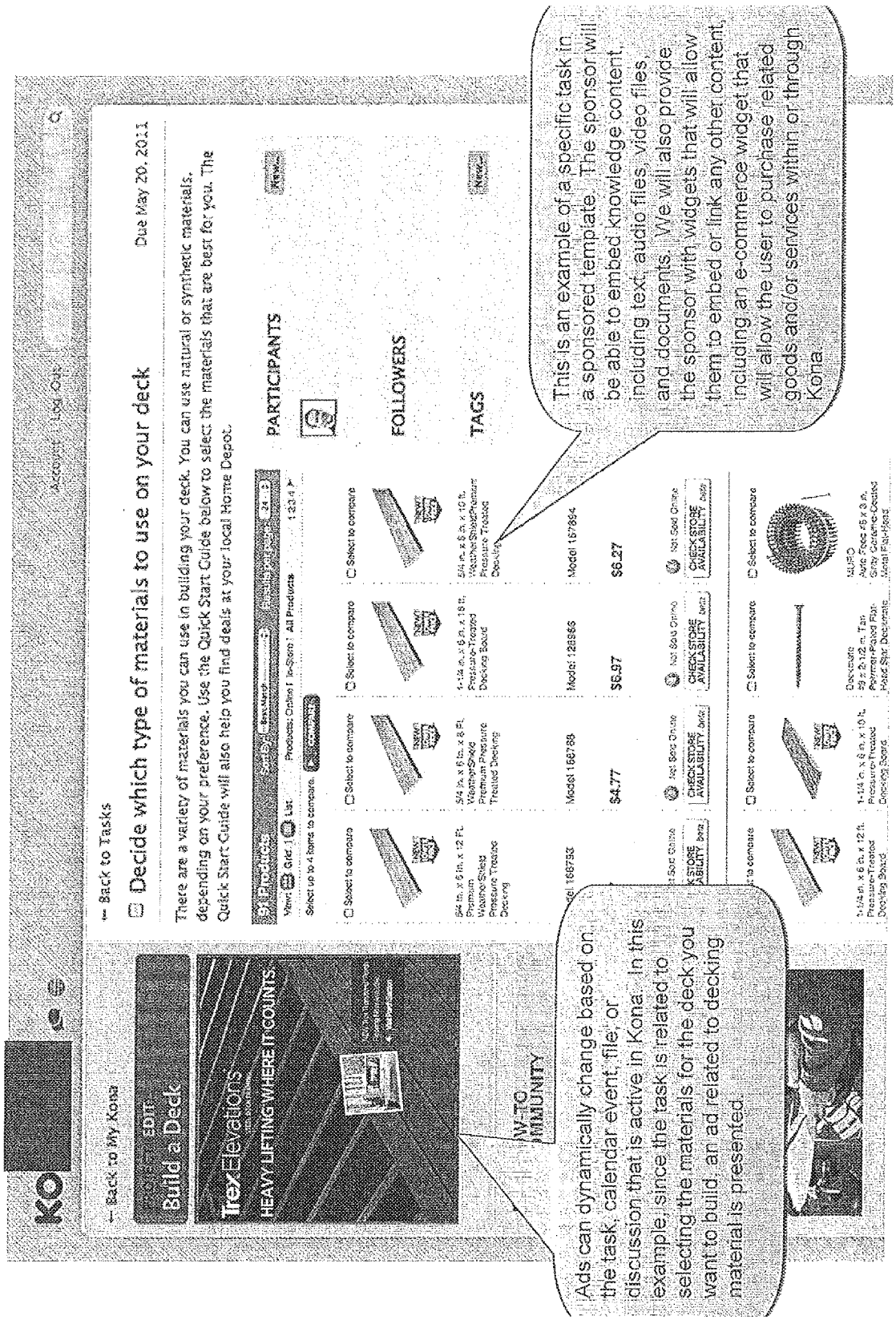

FIG. 12 illustrates an example screen shot illustrating how ad word intelligence may be utilized. For example, if a user is building a deck as a project, one of the tasks may be deciding which type of materials to use on the deck, as shown in 1205. Note that the tasks may be shown only for a particular project (e.g., as shown in FIG. 9); or tasks for multiple projects may be shown, listed according to when they are due (e.g., as shown in FIG. 10). When the user accesses this task, in 1210, various information may be shown to the user. For example, knowledge content including text, audio files, video files, and documents may be shown (e.g., by a sponsor). In addition, widgets may allow the user to see various items for sale related to the task, with a e-commerce widget that may allow the user to purchase needed goods or services. In addition, in 1215, the ad word intelligence may be utilized to illustrate ads related to the specific task the user is working on.

Other examples of utilizing ad word intelligence may include a user entering a recurring calendar event called "Soccer Practice". At this point, sporting goods partners may push ads for soccer sporting gear. In addition, a user may enter a project name, task, discussion topic, or upload a file, all of which may provides potential context to an advertiser about what an individual is about to do. This context is highly valuable to an advertiser. Another example is a task entitled "schedule oil change". In this case a coupon from a partner that provides oil changes may then be shown to the user, with the ability to schedule the oil change. The scheduled oil change may then be added to the user's calendar. As another example, a user may enter a task entitled "spring cleaning". At this point, partners may push specific advertising on cleaning supplies to the user. In addition, helpful tips (e.g., safety tips, cleaning tips) may be provided by partners to the user. The user may even be offered and/or purchase products and/or services related to the spring cleaning. As a further example, if a user attempted to create a project entitled "organize Girl Scout cookie drive", a Girl Scout Cookie Drive project template could be offered to the user.

Figure 4:
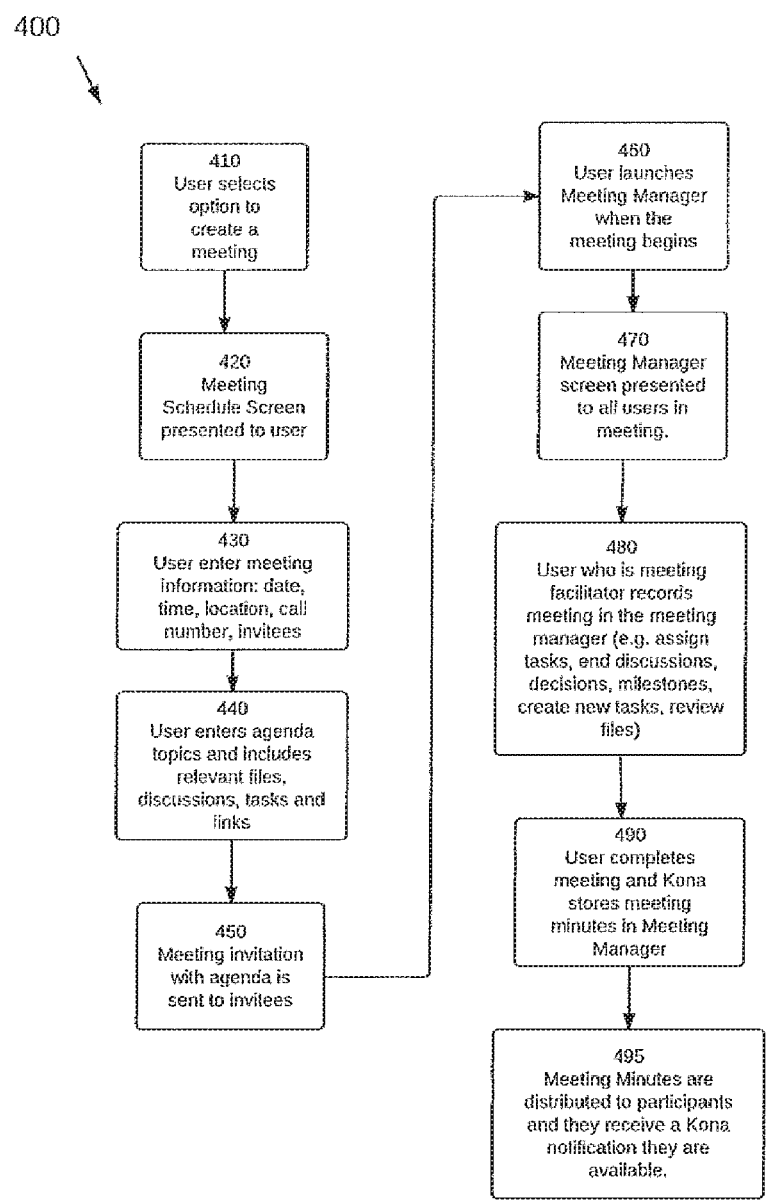
FIG. 4 illustrates a method for utilizing meetings, according to an embodiment.
Figure 13:
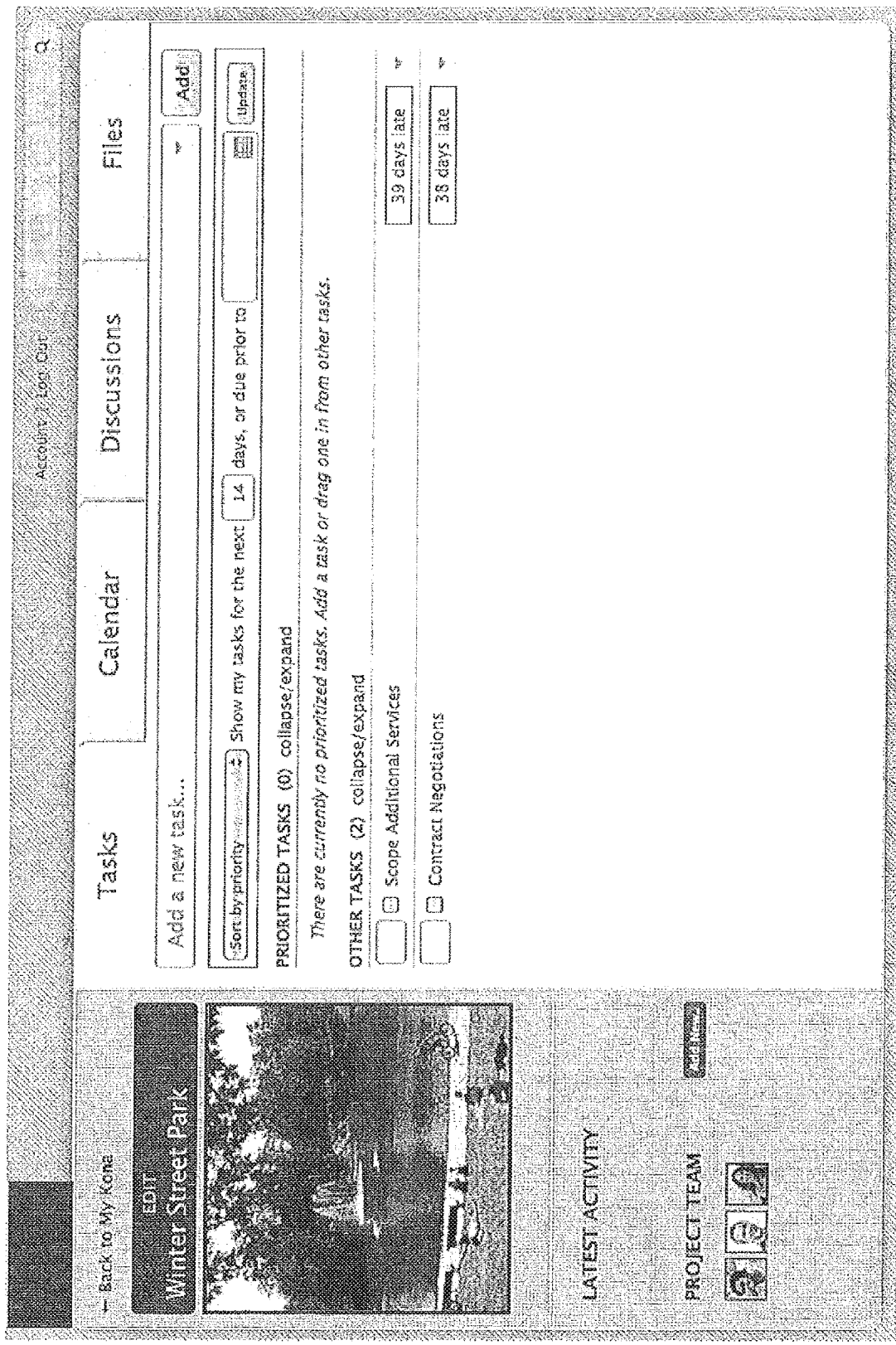
Figure 14:
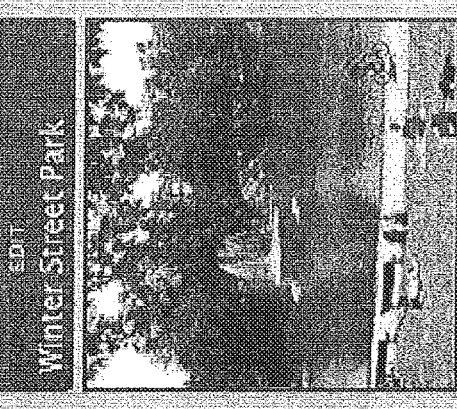
Figure 15:
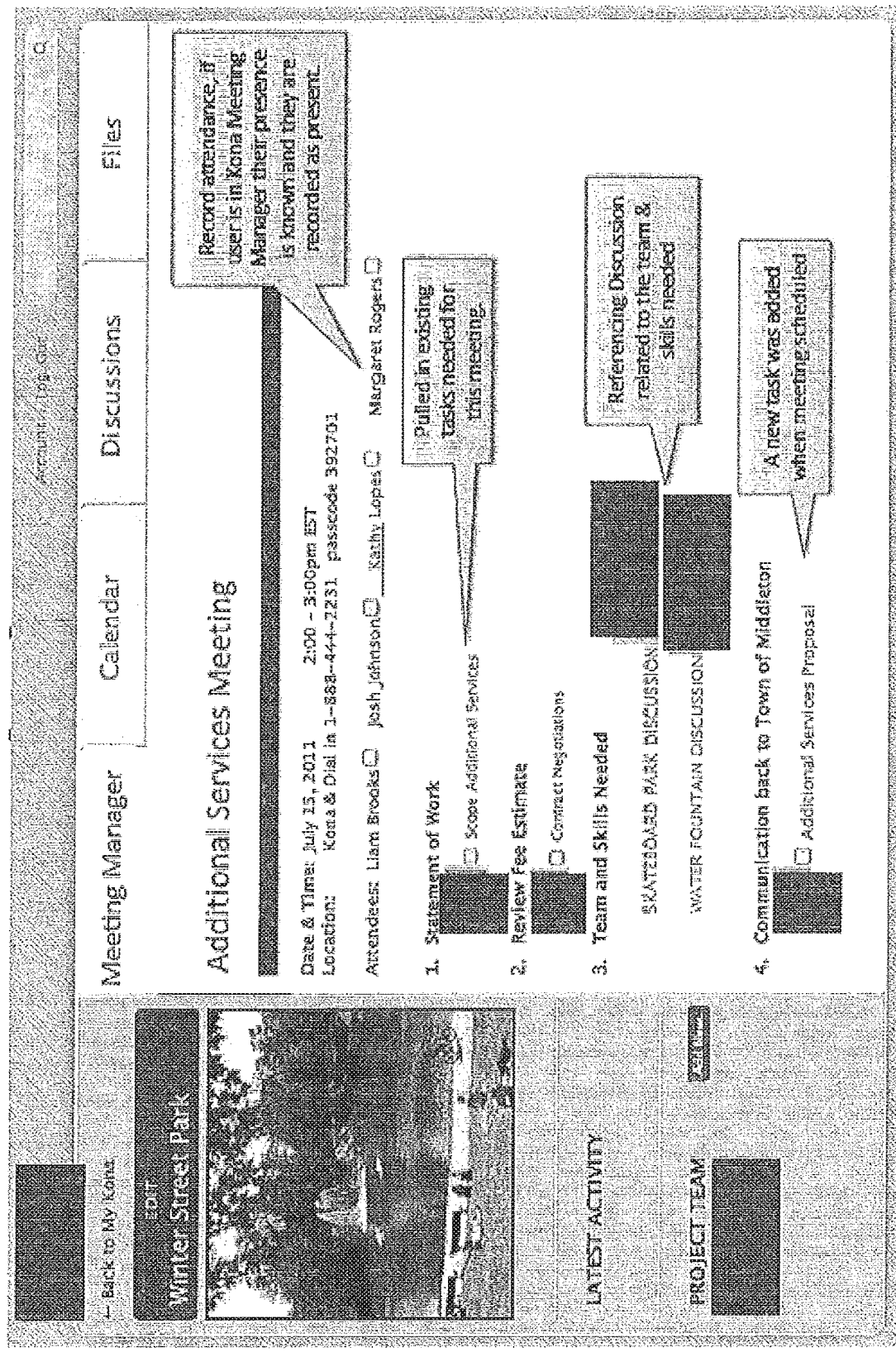

FIG. 4 illustrates a method for utilizing meetings, according to an embodiment. A meeting manager may be used by a user to create meeting agendas and reference existing project tasks, files and discussions within the context of the meeting agenda. The meeting agenda may be viewed and updated during the meeting by multiple participants if the organizer allows. In addition, the meeting attendees may have web and video conferencing so that all meeting participants may see changes to documents, etc. in real time. The presence of attendees may also be shown and recorded. In addition, each user may take notes and choose to make the notes public or private. In 410, the user may select an option to create a meeting. At this point, as shown in FIG. 13, all past and scheduled meetings for one or more projects may be shown. The user may sort the meetings by meeting owner, meeting date, and/or meeting name. In addition, the user may search meetings by meeting owner, meeting date, meeting name, and/or meeting attendees. In 420, a meeting schedule screen may be presented to the user. In 430, the user may enter meeting information, such as, but not limited to: date, time, location, call number, or invitees, or any combination thereof. In 440, the user may enter the agenda topics. FIG. 14 illustrates an example meeting screen shot where the date, time, location, call number, invitees, and meeting agenda have been entered. Relevant information may also be provided, such as, but not limited to: files; discussions; tasks; or links; or any combination thereof. FIG. 15 illustrates an example screen shot where attendees may be automatically recorded as present for a meeting when their presence is detected in the meeting manager. FIG. 15 also illustrates meeting topics with project tasks and discussions being referenced under topics as well as a new task being added within the context of building out the meeting agenda.

Figure 16:
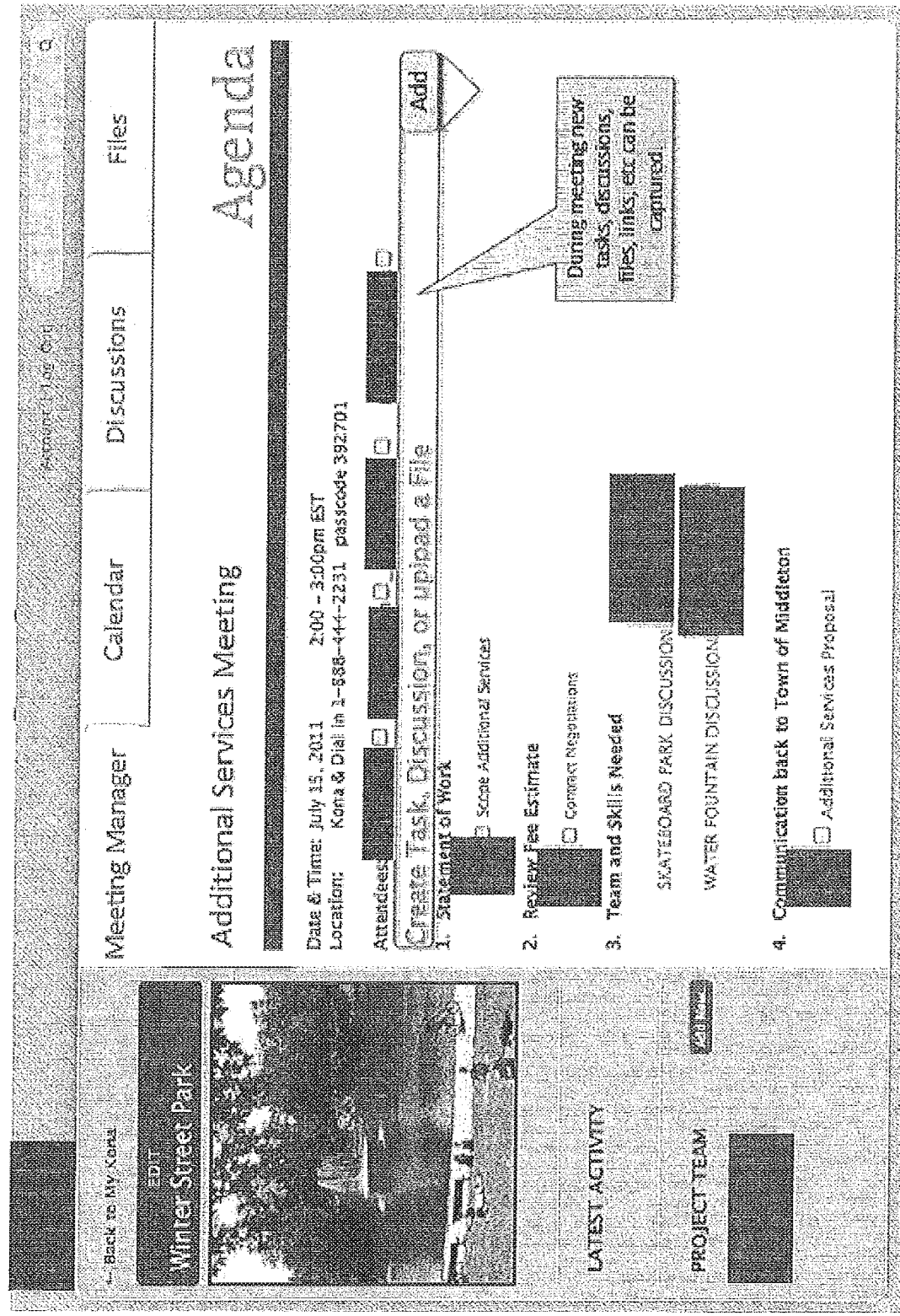
Figure 17:
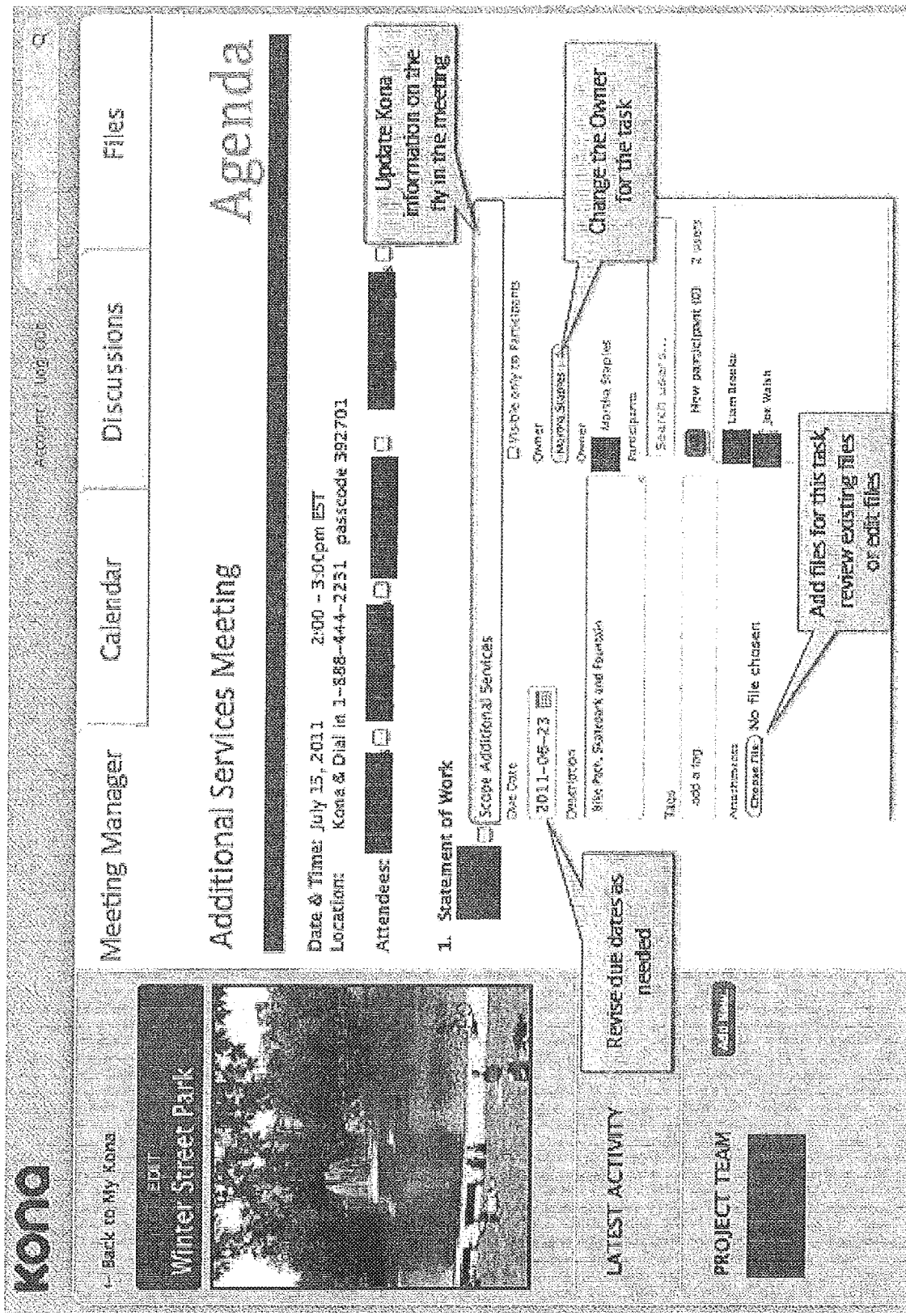
Figure 18:
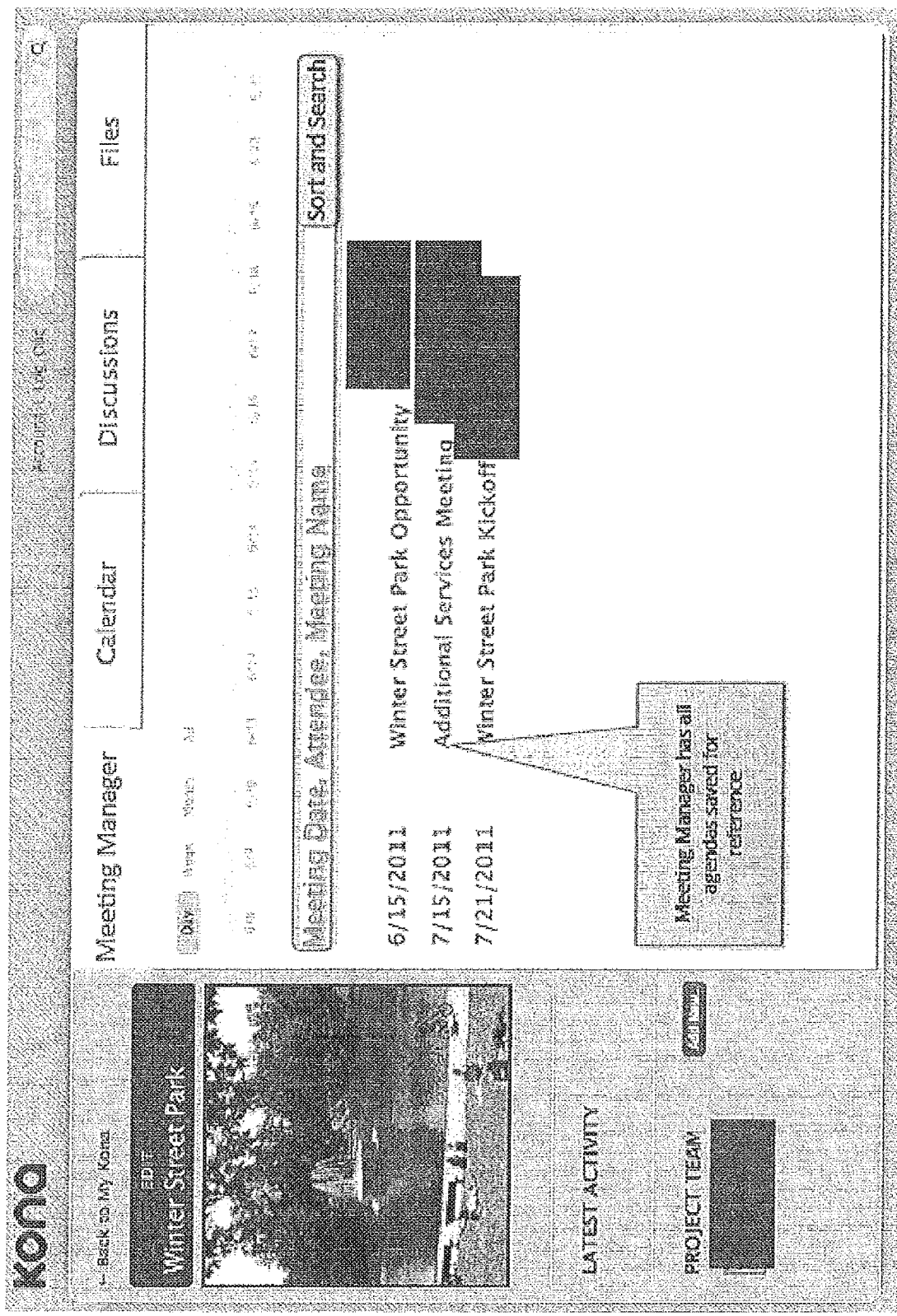

Referring back to FIG. 4, in 450, a meeting invitation, perhaps with a meeting agenda, may be sent to invitees. In 460, the user may launch the meeting manager when the meeting begins. In 470, the meeting manager screen may be presented to all users in the meeting. In 480, the user who may be the meeting facilitator, may record various information from the meeting, including, but not limited to: assigned tasks, discussions, decisions, milestones, create new tasks, or review files, or any combination thereof. FIGS. 16 and 17 illustrate screen shots where such information may be captured. FIG. 16 illustrates where new tasks, discussions, files, links, etc. may be captured. The meeting facilitator may need to organize an agenda and may thus drag tasks and decisions into the meeting manager space. This may create associations between those objects and the meeting calendar event which may be helpful for future references to the meeting. FIG. 17 illustrates how the agenda items may be updated during the meeting. For example, in FIG. 17, the due date may be changed (e.g., see 1710), the owner of the task (e.g., Scope Additional Services related to the bike path, state park and Fountain) may be changed (e.g., see 1705), and attachments related to the listed task may be shown and accessed (e.g., see 1715). In 490, the user may indicate that the meeting is complete, and the various recorded information may be integrated into the project management system 103. For example, in FIG. 18, all agendas for all meetings may be saved. For example, the project management system 103 may maintain an audit trail of everything that is happening in a meeting such as decisions that were made, tasks that were completed and new items added. These are all captured with a reference to the meeting name, project and date. When a user pulls up a past meeting agenda they will see all the meeting activity and notes related to it. In 495, meeting minutes may be distributed and/or otherwise made available to participants.

For example, if a user and his team wish to hold a meeting, during the two weeks leading up to the meeting, the users may identify topics for their meeting. One or more facilitators may be designated. Once the meeting has taken place, if some users have made their notes available, other users may be able to access these notes, if the other users are given permission (whether or not the other users participated in the meeting). Users may access these notes through the meeting manager and select the meeting agenda, which may include all the tasks, topics, decisions, comments and notes that were captured during the meeting. A user may also search the project notebook to retrieve notes pertaining to projects, topics, dates or text. If a user joins mid-meeting, and has permission to access notes, the user may see what happened in the meeting before the user joined. In addition, because the agenda has been updated and added to during the meeting, if a user misses a meeting, the user can see what happened in each agenda item, and perhaps access various users' notes to determine the thought process and decisions of the meeting. Managers may also use the agendas and notes to train or evaluate other users. In addition, managers may add information to the agendas or minutes to offer additional insight for consideration.

Figure 5:
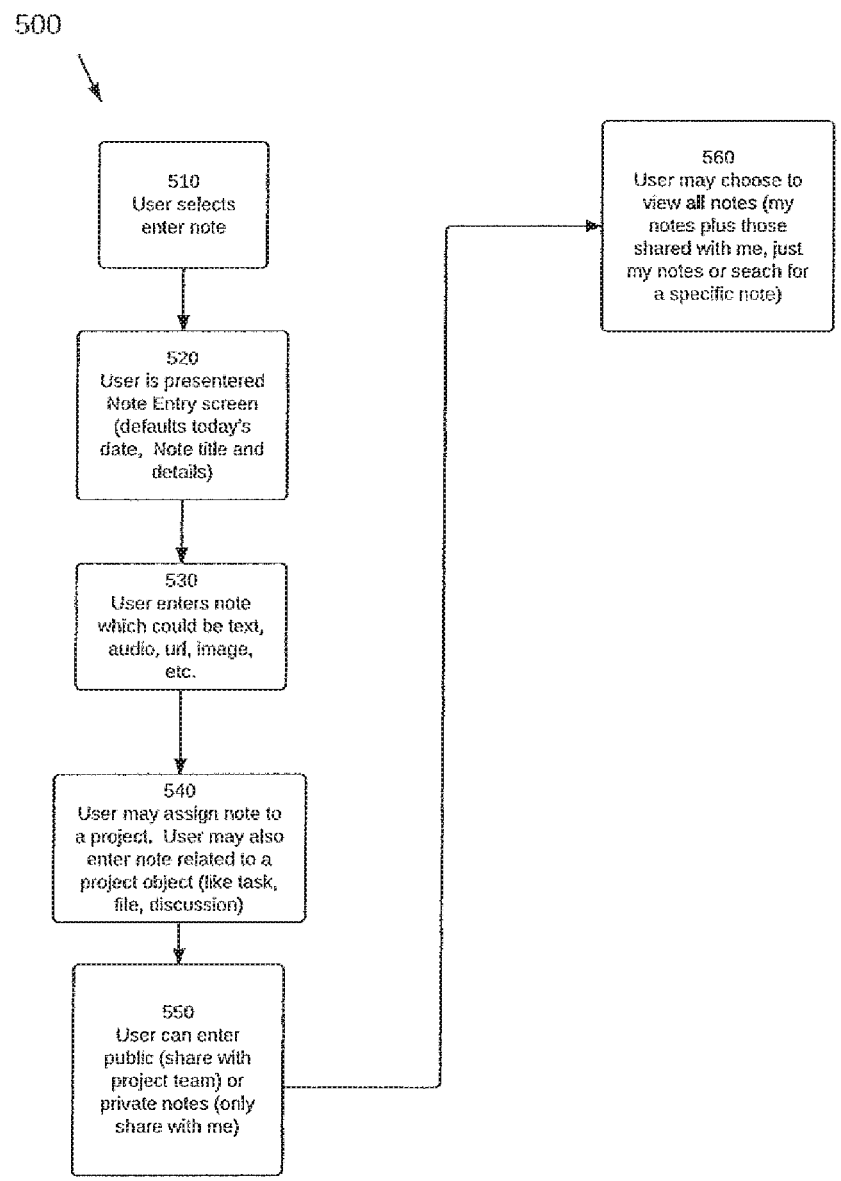
FIG. 5 illustrates a method for utilizing a notebook option, according to an embodiment.
Figure 19:
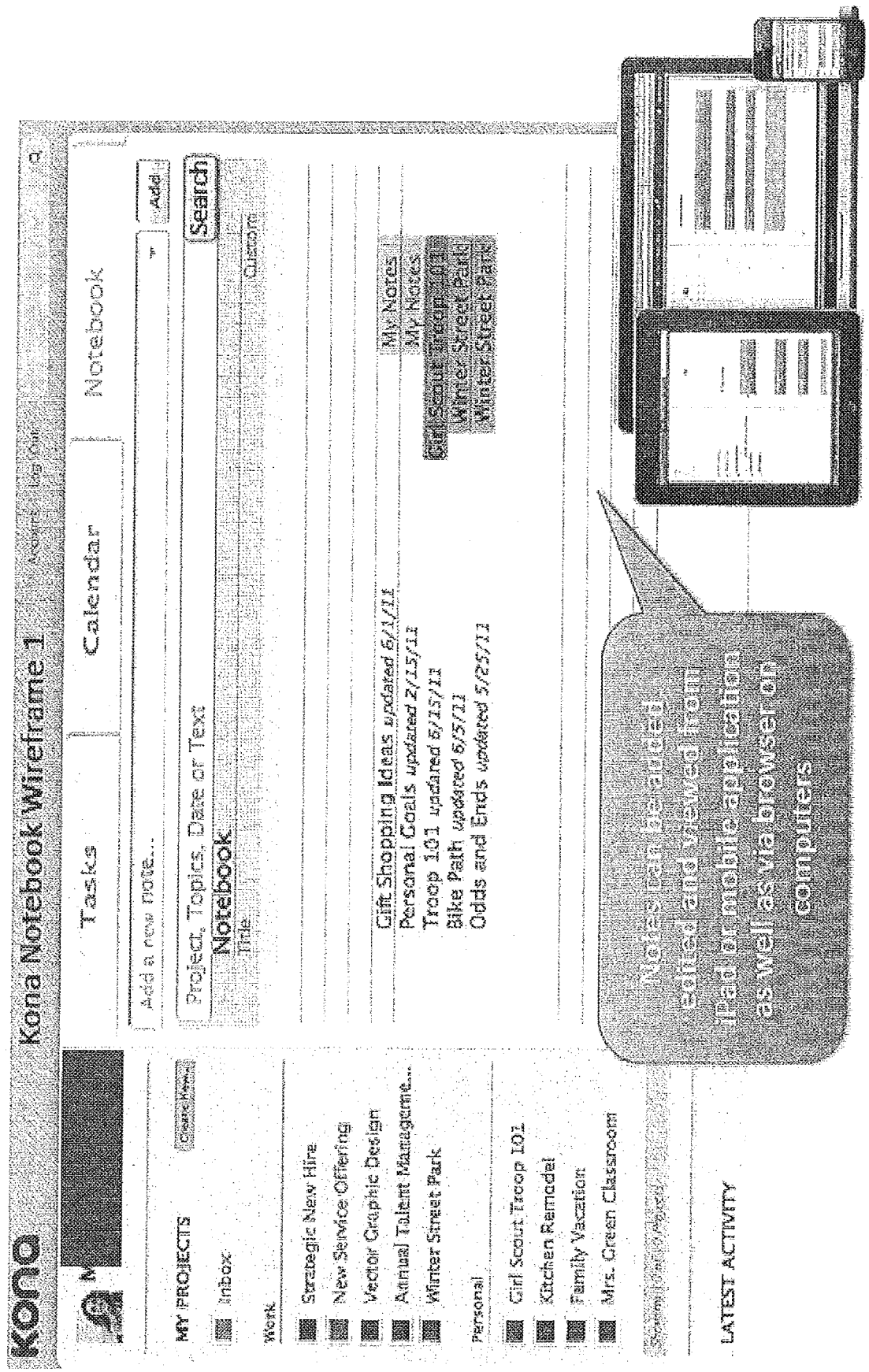

FIG. 5 illustrates a notebook option, according to an embodiment. By utilizing the notebook option, a user may be able to use a note feature with the collaboration and visibility provided by the project management system 103. A user may be able to capture a note using any computer or electronic device through emailing, texting, or entering notes to a project. The project management system 103 may be utilized to view, edit, and record the notes. In 510, the user can select an option to enter a note in the notebook. The user may do this, for example, by using the "Add a new note" option shown on FIG. 19. In 520, the user may be presented with the note entry screen. In 530, the user may enter the note, for example, as text, audio, URL, image, etc. In 540, the user may assign the note to a project. The user may also enter the note as related to a project object, such as a task, file, discussion, decision, milestone, calendar event, etc. In 550, the user may make the note public or private, or public and/or private with respect to only certain individuals. In 560, the user may choose to view notes. For example, the user may view all the user's notes related to a project. Or the user may view all viewable (e.g., public—allowing the user to view) related to the project. For example, FIG. 19 illustrates a list of notes, with an associated project name. (Notes, similar to tasks, calendar, and other information, may be accessed by tabs at the top of the user's project page. For example, see the tabs listed at the top of FIG. 19.) Notes may be added, edited and viewed utilizing any type of computer (e.g., laptop, desktop, iPad, iPhone, etc.).

Figure 20:
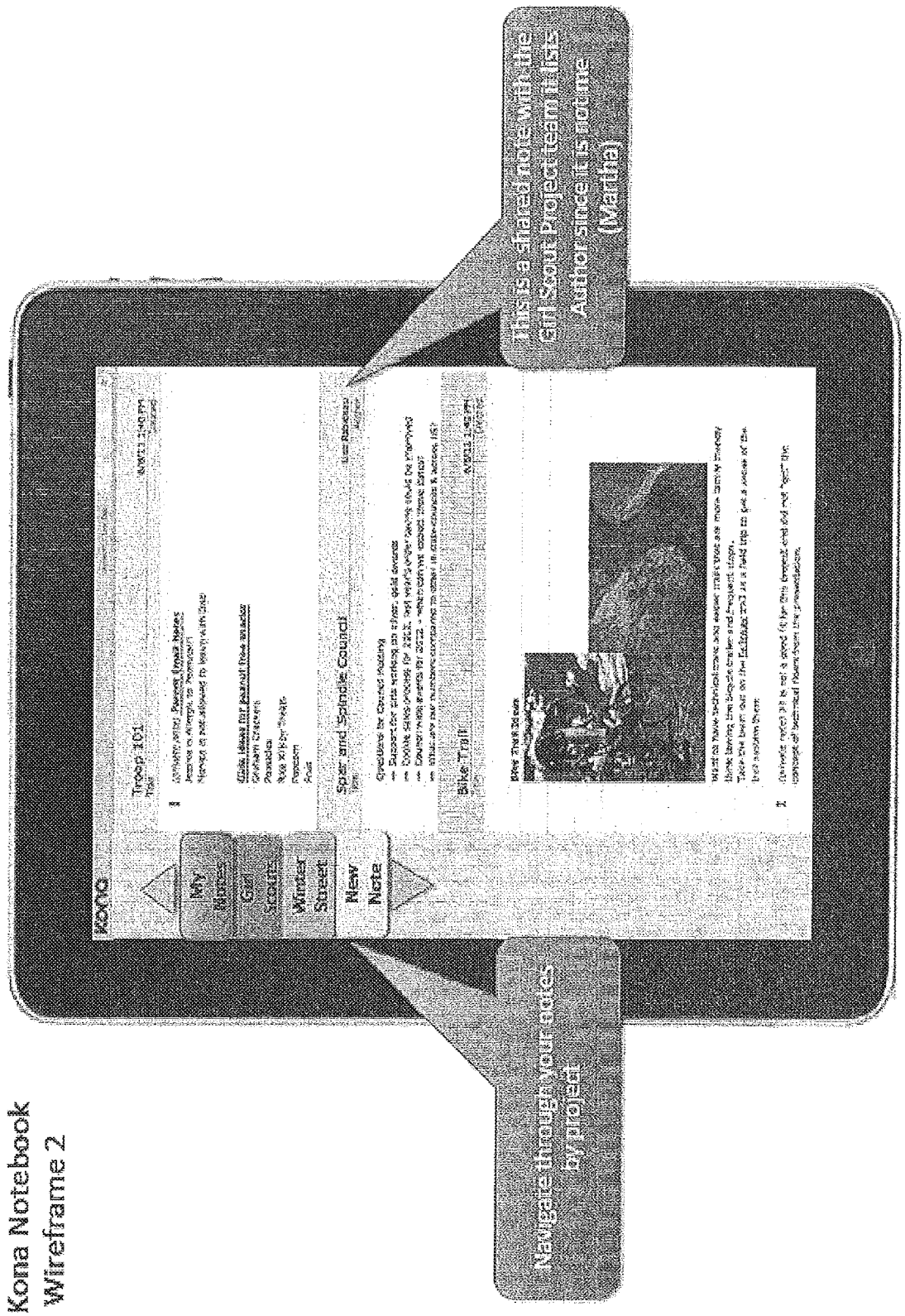
Figure 21:
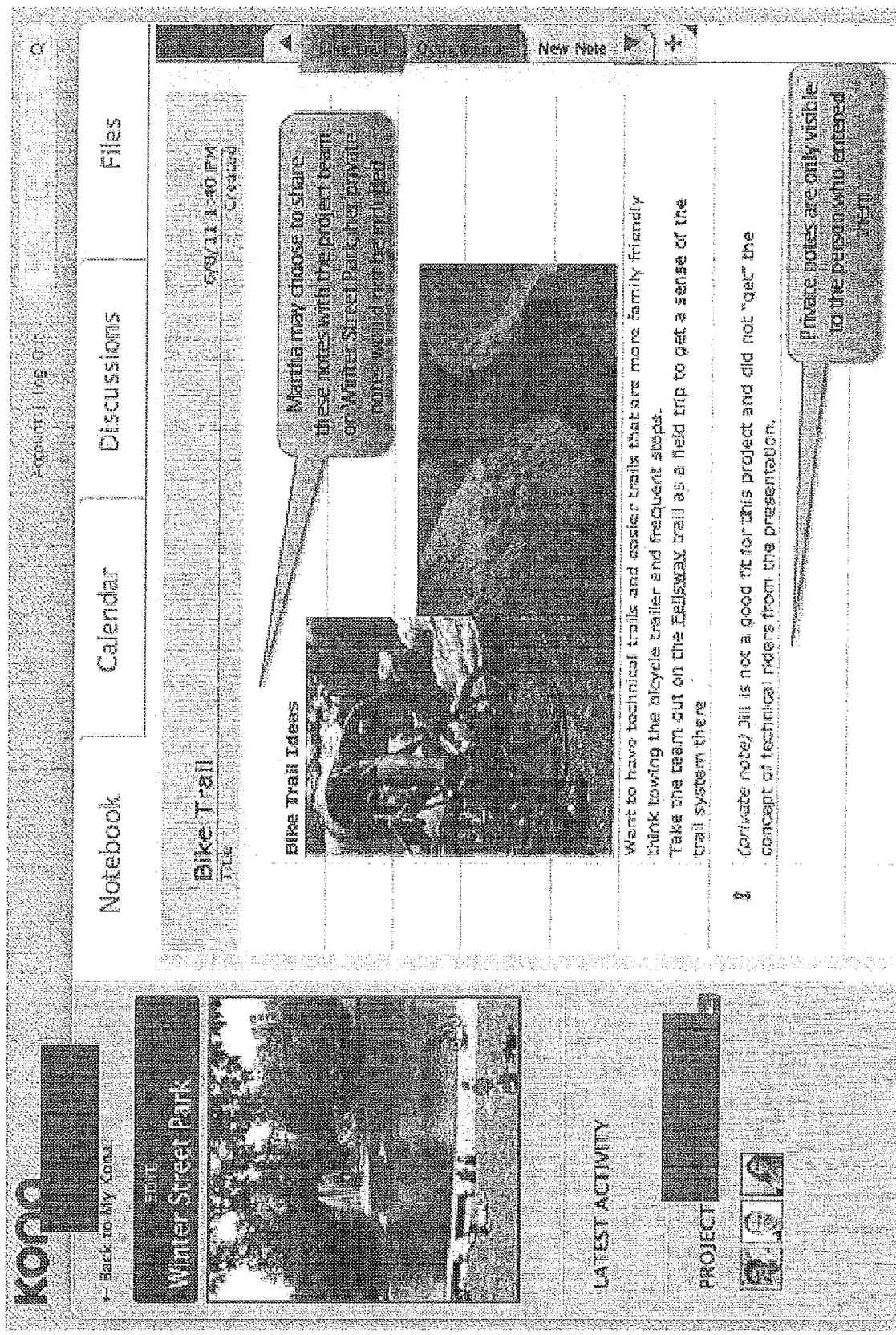
Figure 22:
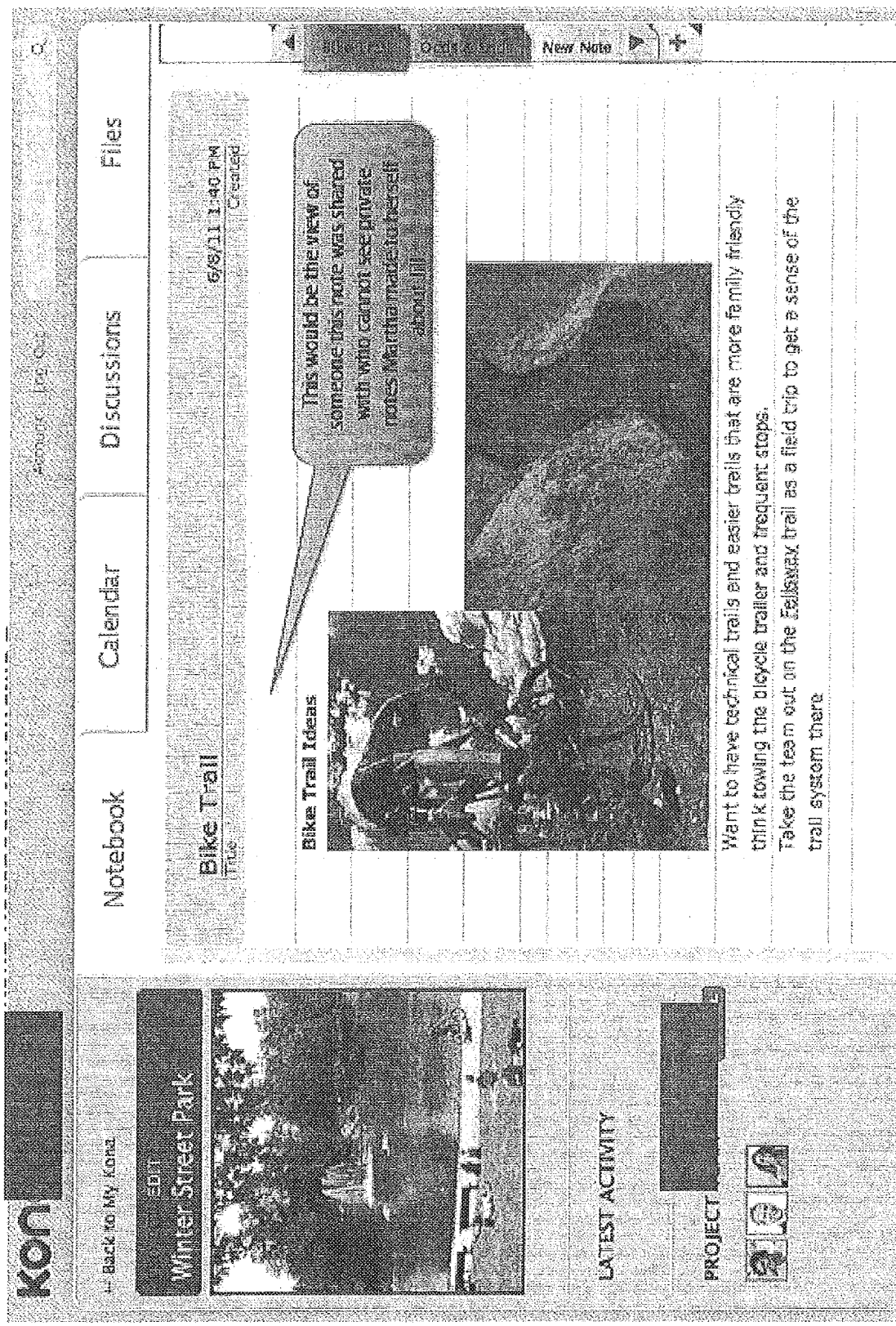

FIG. 20 illustrates a list of notes under various project names. Shared notes as well as user notes may be listed. FIGS. 21-22 illustrate set up and view of a note where various parts of the note are private and various parts are public. FIGS. 20-22 may be accessed utilizing the screen illustrated in FIG. 19. FIG. 19 shows an index of "all my notes" and "notes shared with me" by topic. The user may be able to search her notebook by project, topic, date or text. In this case, the user is searching a range of dates. When the user selects an entry, the user may access the note page for that entry, which may include the user's notes and notes shared with the user pertaining to that entry. FIG. 21 illustrates an example where notes taken pertaining to a particular project are shown. The user is taken into the project notebook for the Winter Street Park project and the entry is Bike Trail. FIG. 20 illustrates a wireframe for the notebook on an iPad where the user is navigating through all their entries and viewing all the entries. This is an alternate notebook view which may include the user's compiled notebook across all projects.

For example, if two coworkers are taking notes during a project with a large group of people, the two coworkers may wish to take and share notes with only each other during the meeting. In addition, each coworker may make only personal notes that only he or she wishes to be able to access after the meeting.

As another example, if a family has a gift swap every year, various family members may share hints for what they would like, as well as links, pictures, or text information. Private notes may then be added by family members as suggestions for gifts for other family members. The private notes could be viewed by only the persons the note author wishes to see the note.

As a further example, a user could add a recipe as a note to a family gathering project. Another user, who is making the recipe, may add notes on how to make the recipe better, and keep those comments private.

Figure 23:
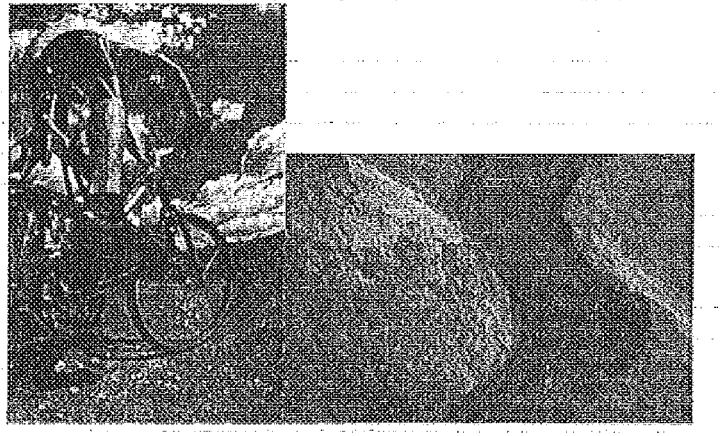

FIG. 23 sets forth additional example notes with the private/public feature incorporated. As shown in FIG. 23, when a user is making a new note, the user can choose to make the entire entry private or just a portion of it private. For example a soccer coach may share with all parents some notes on parent drop off and pickup from practice with some simple do's and do not's, such as: be on time, do not leave your child at the field for practice if the coach is not there, etc. The coach may also include a private note about Jill's pickup situation as a personal reminder she is not to be released to her dad. The coach may thus share all the notes except he would mark the one about Jill as private. The other parents would see all the do and do not's but not the note about Jill. However, the couch when viewing this entry would see all of them. Another example is that the couch, while watching select team tryouts, may want to capture some video with notes about his players' strengths and improvement areas. The coach may wish to mark this entire section Player Skill Assessment as private, as he would not want the parents seeing his observations about the entire team. Later he may choose to go in and share Maggie's assessment with her parents only and Jennifer's with her parents only.

Figure 6:
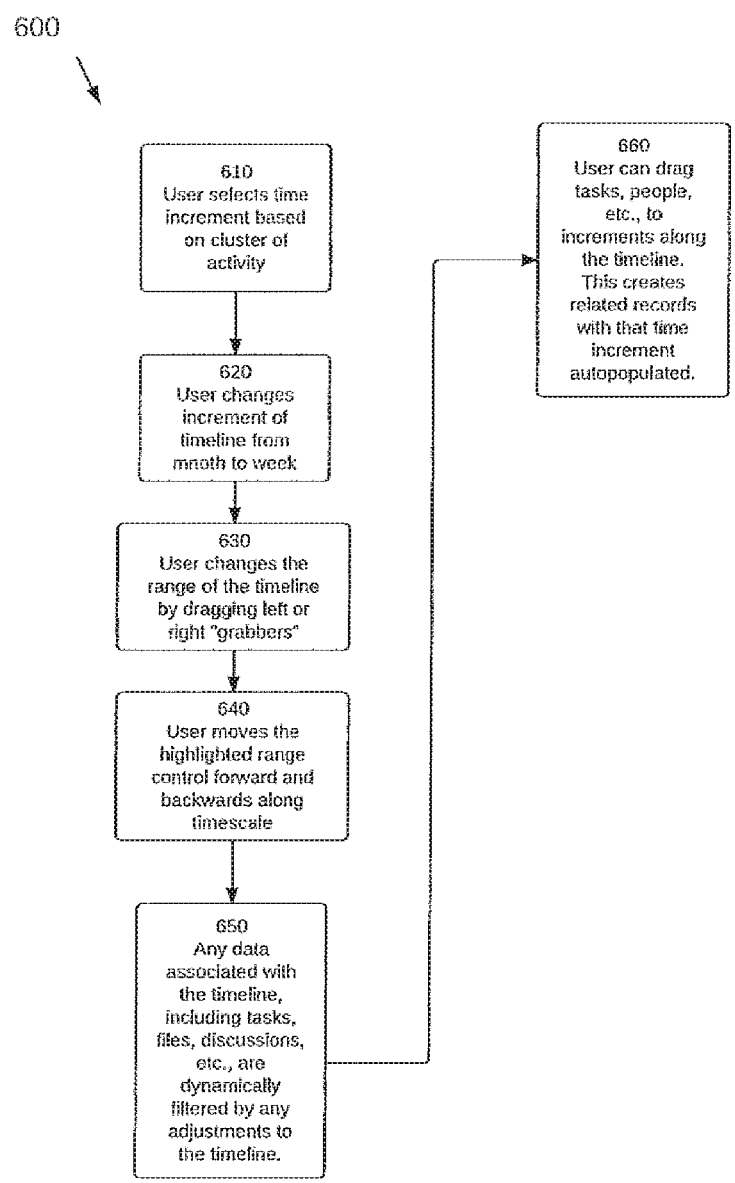
FIG. 6 illustrates a method for utilizing a project timeline feature, according to an embodiment.
Figure 24:
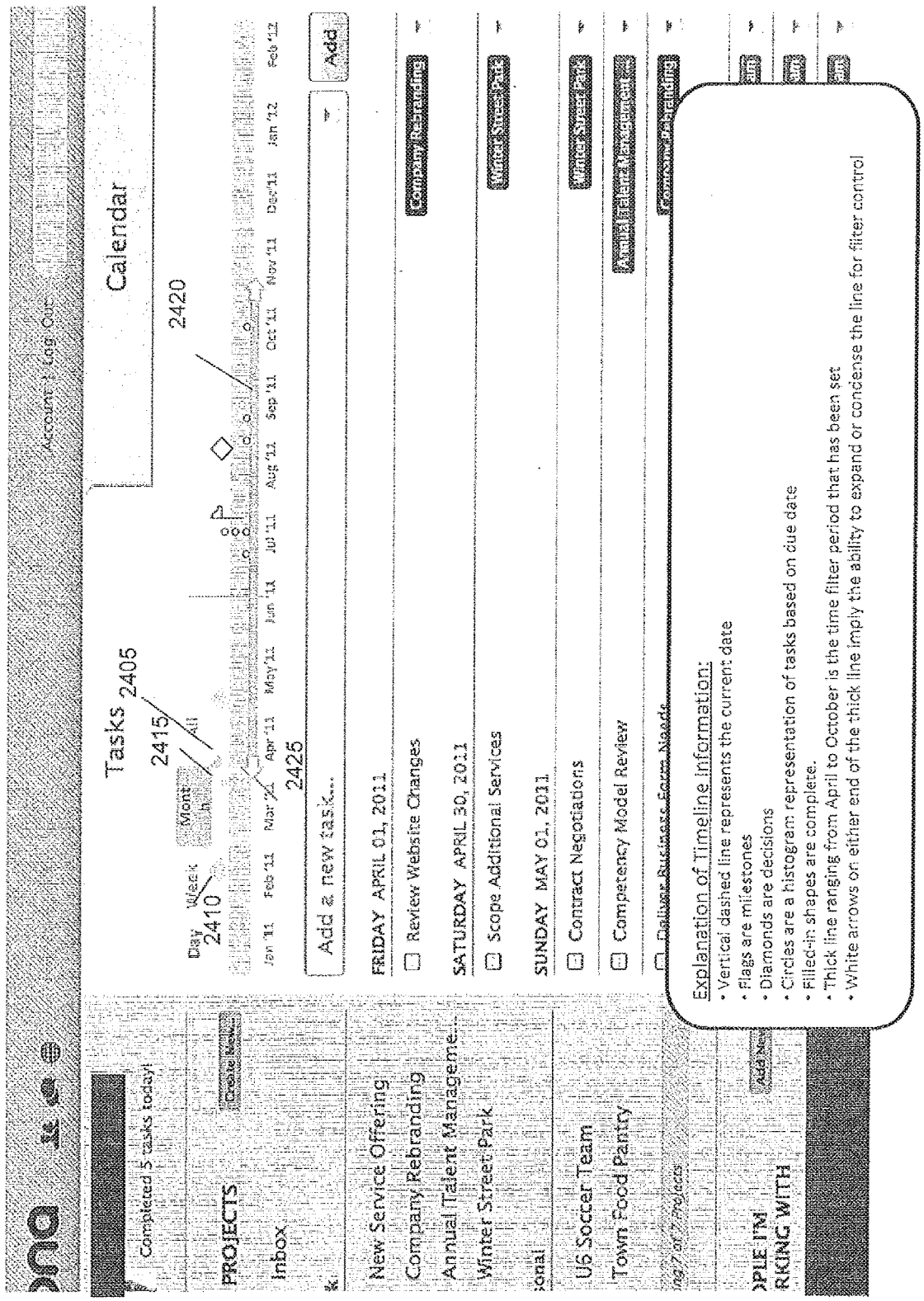

FIG. 6 illustrates a flow chart for a project timeline feature, according to an embodiment. FIG. 24 illustrates a view of a user page where the elements of a timeline are shown, according to an embodiment. The elements on the timeline (e.g. milestone flags, decision diamonds, and circles that represent tasks) may be placed on the timeline through the information entered into the project management system 103 related to project, due dates, etc. The elements appear on the timeline based on the detail entered for the milestones, decision points, and tasks, as well as based on filter criteria set for the screen such as time period and project. A user may be presented with all the activities on a timeline, as well as with areas where the user should focus. A user may view the suggested timeline and edit the timeline as appropriate. Flags 2405 may illustrate milestones. Diamonds 2410 may illustrate decisions. Circles may illustrate a histogram representation of tasks that must be done by certain dates based on the due date of the project. The flags, diamonds and circles that are filled-in may represent milestones, decisions and tasks that are completed. The thick line 2420 ranging from April to October '11 may represent a time period filter that the user has turned on for the timeline display. All information and data displayed for the user respects the time line filter control. The white arrow 2425 on either side of the thick line 2420 may represent the ability to expand or condense the timeline.

Referring back to FIG. 6, in 610, a user may select a time increment based on a cluster of activity, or a time increment can be preset and automatically generated. For example, in FIG. 24, the time increment can be January 2011 to February 2012. In 620, a user may change the increment of the timeline (e.g., from one month to one week). In 630, the user may change the range of the timeline (e.g., by dragging left or right on the timeline). In 640, the user may move the highlighted range control forward and backwards. In 650, any data associated with the timeline, including tasks, files, discussions, etc. may by dynamically filtered by an adjustments to the timeline. The thick line 2420 is a sliding definition of time. Line 2420 can span increments of days, weeks, and months depending on what the user has selected. The number of increments line 2420 spans is defined by the user. The user can expand or reduce each end of line 2420 to increase or decrease the number of increments for the filter to cover. The expansion and reduction is possible by hovering on line 2420 with a mouse and moving either end in the desired direction. On a touch screen line 2420 is expanded or reduced by pinching mechanics. If the user desires line 2420 to maintain the same number of time increments but be moved to a different time span, the user can click on line 2420 and drag it to the new desired location. Similar action is possible on a touch screen.

In 660, the user may drag tasks, people, etc. to increments along the timeline. This may create related records with that time increment auto populated. For example, a task may show up overdue because it was due yesterday June $20^{th}$. It is now known that the task does not need to be completed until next week on June 28th. The current timeline filter control is set to span the last three days and the next three days or June 17-June 22. June $28^{th}$ is shown in the timeline but the span of line 2420 does not include June $28^{th}$. The user drags the task from the list below the timeline by clicking on the task name and then moving the mouse to the June $28^{th}$ date increment where they release the mouse click. The due date of the task now changes to June $28^{th}$ and gradually fade from view because it is outside of the time filter control set by line 2420.

By using the timeline, users may be able to visually see key decision points that need to be made (with their due dates) going forward, and also review when key decision points were made in the past. Supporting reasons may also be attached to the decisions.

In addition, milestones may be shown on the timeline. Milestones may be created from the add new bar within a project specific page. The milestones may be specific points in time identified on the project or a grouping of tasks for which completion represent an important date within the project. The timeline thus allows team members to visually see milestones across a timeline and identify periods of times where there are clusters deserving of focus. Milestone icons on the timeline may be clicked on or hovered over to obtain more detailed information about the milestone. If the milestone is a group of tasks, the tasks specific to the milestone may be shown in the task display area of the screen.

Tasks may be represented on the timeline differently from decisions and milestones. They may be generated by the user either from the home page or a project specific page. The task completion date shows when things were done on the project or when things are due in the future.

All past conversations, messages, project discussion activities, and task comments within a project may be represented on the timeline to reflect volume of activity. The history of when files were posted to a project over a time scale may also be provided. This information may be accessible by a separate icon and may be turned on or off in conjunction with tasks. This may be show to illustrate clusters of activity volume to better understand the progression of how people have worked on the project and where to focus attention when replication a repeatable project.

The timeline may be divided into increment blocks across the top of the screen (e.g., 14 increment blocks). These increment blocks may change by day, week, or month, so that the timeline shows various periods (e.g., 14 days, 14 weeks, 14 months). If the project is longer than the increment blocks shown, an all button may show the entire project time period. The user may zoom in and out by changing the day, week, months, or all scale. The user may view periods of time in the past and/or the future.

The user may select any incremental amount of time within any scale. This may be around a date range the user cares about (e.g., the next month or a period with a high activity of tasks or messaging volume). If the user clicks on one month and then changes the scale from month to week, the user may then see the 14 weeks around that month with the weeks that fall in the previously selected month highlighted as active for the time filter control. Below the timeline, all of the tasks and other activities within the highlighted time period may appear for progressive detailed investigation and the volume of activity previously condensed to a monthly view may be dispersed into weekly periods of activity. By dragging one end of the timeline or pinching both ends of the multi-week highlighted area, the user may condense the timeline to fewer weeks or expand it to more weeks than what was originally returned when the user clicked on one month. The decisions to stretch, condense, or otherwise change the time scale of the increments may be based on volume of activity the user is seeing within the time frame the user is looking at. As the user changes the time period, the information shown is based on the time period selected.

In some embodiments, the user may aggregate information related to some or all of the user's projects (e.g., work projects and/or personal projects). This multi-project view may be specific to the user's responsibilities and filtering desires, which may help the user identify upcoming busy periods and keep track of past performance. The user may see clusters of busy periods and select them for further inspection. The tasks due in the period of time they selected are returned for further investigation in progressive levels of detail. Milestones and decisions (e.g., shown as icons) across all of the chosen projects may be aggregated into the timeline view. The icons may be drilled down for further information.

In some embodiments, the timeline may show the user the history of their messaging patterns to help the user find past messages posted by certain individuals. The user may set a time period for history viewing in the conversation center (also referred to as message center) (see FIG. 7) based on the time period the user remembers, or the user may investigate spikes in message volume at certain points in time. If the user selects a time period, details related to the messages within that time period may be provided, with additional detail available for each message.

Figure 7:
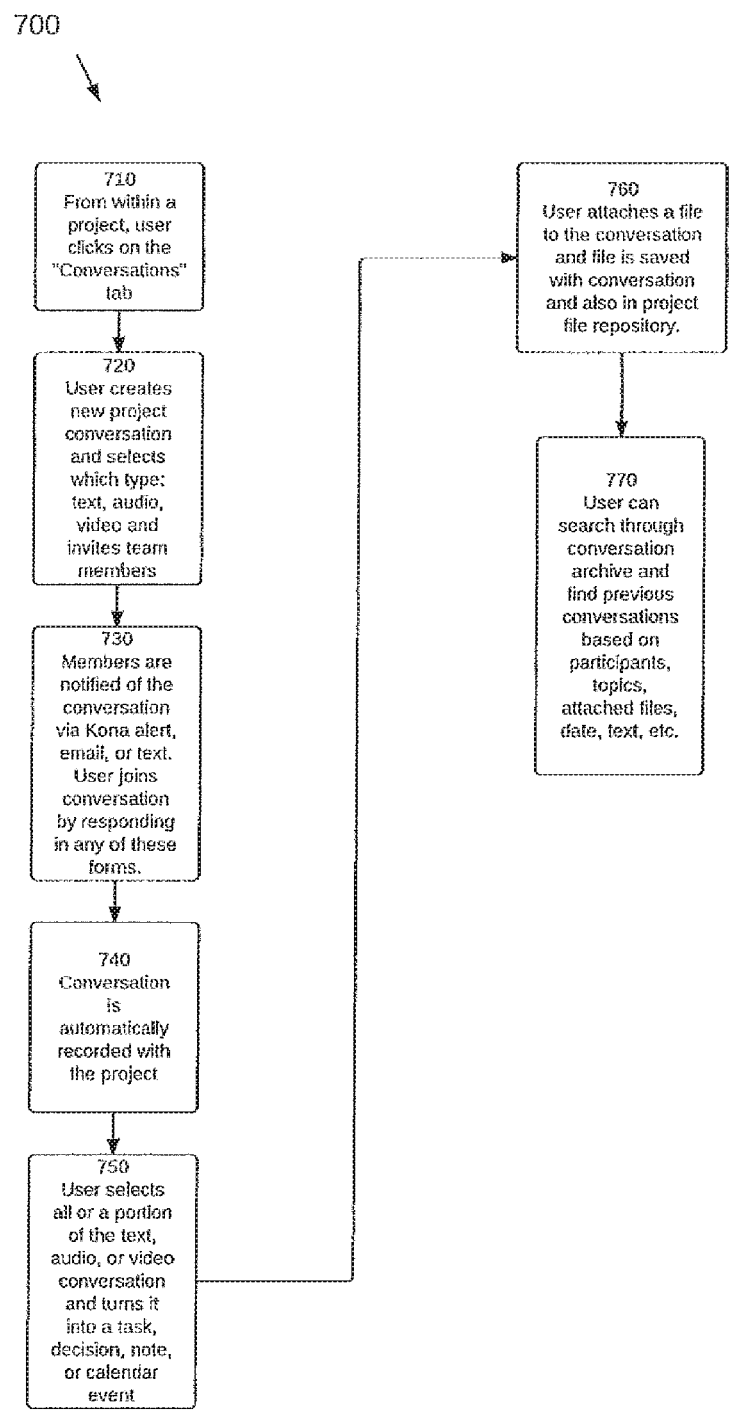
FIG. 7 illustrates a method for utilizing a conversation management feature, according to an embodiment.

FIG. 7 illustrates a conversation management feature, according to an embodiment. Using the conversation management feature, conversations may be recorded and incorporated into a project. In this way, all conversations related to a project may be available to some or all team members of the project, or other individuals (e.g., managers, etc.) In 710, from within a project, a user may click on a conversation tab. In 720, the user may create a new project conversation, selecting which type (e.g., text, audio, or video, or any combination thereof), and may invite team members. In 730, members are notified of the conversation via an alert, email, text, etc. A user may join the conversation by responding. In 740, the conversation is automatically recorded and designated as related to the project. In 750, the user may select some or all of the conversation and turn it into a task, decision, note, calendar event, etc. In 760, the user may attach a file to the conversation and the file may be saved with the conversation and also designated as related to the project. In 770, the user may search through a conversation database and find previous conversations based on participants, topics, attached files, date, text, etc.

Figure 25:
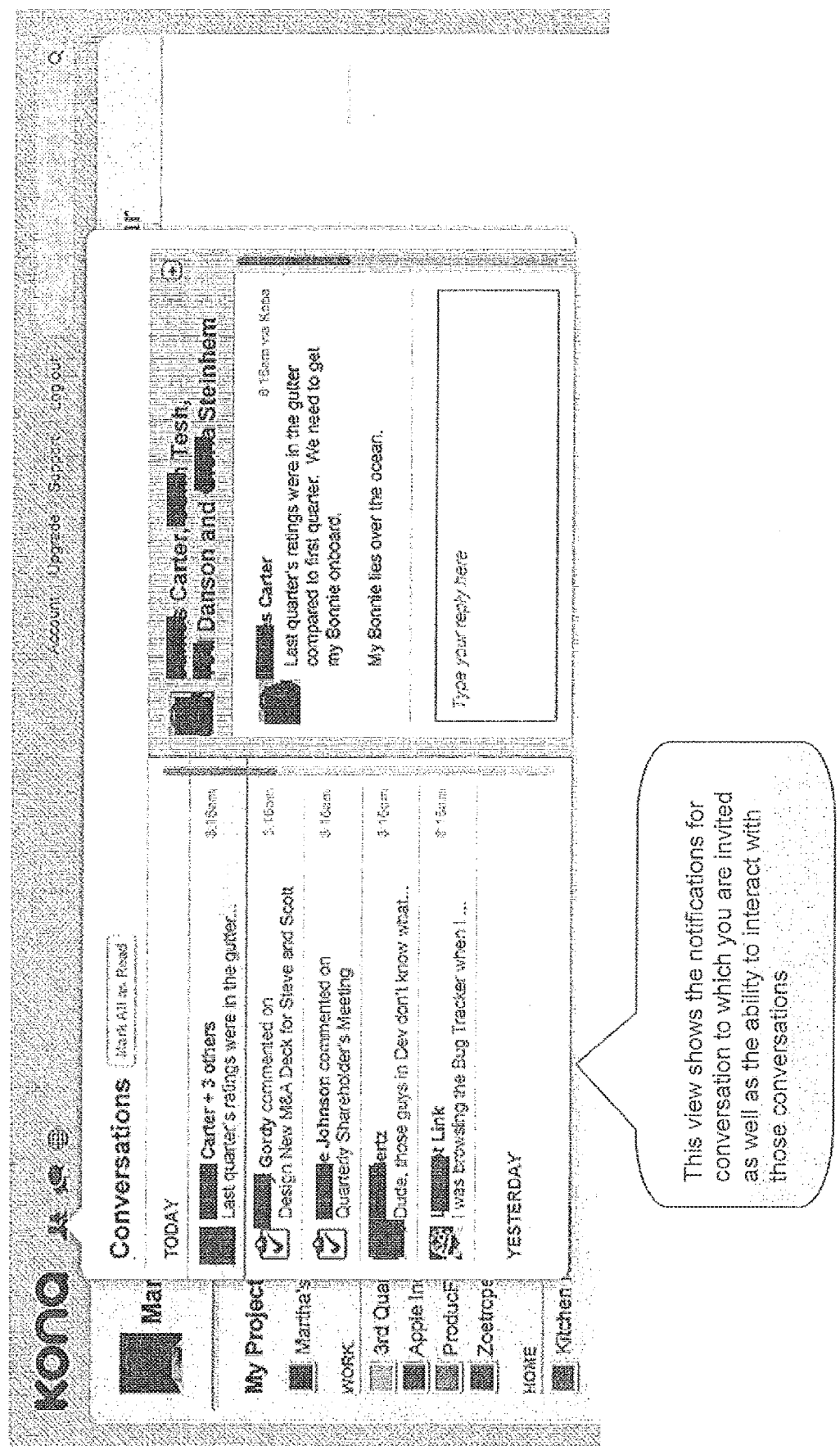
Figure 27:
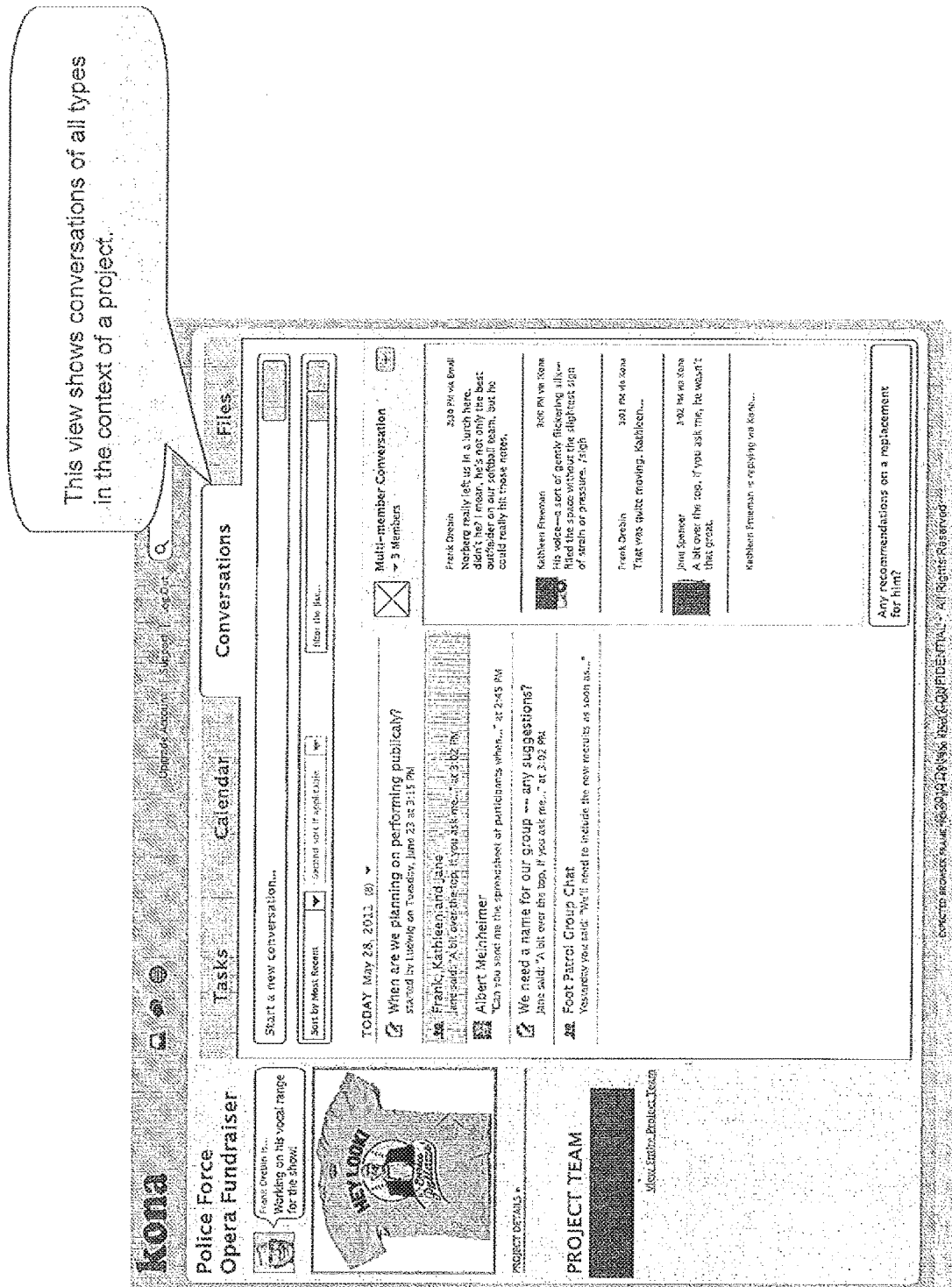
Figure 28:
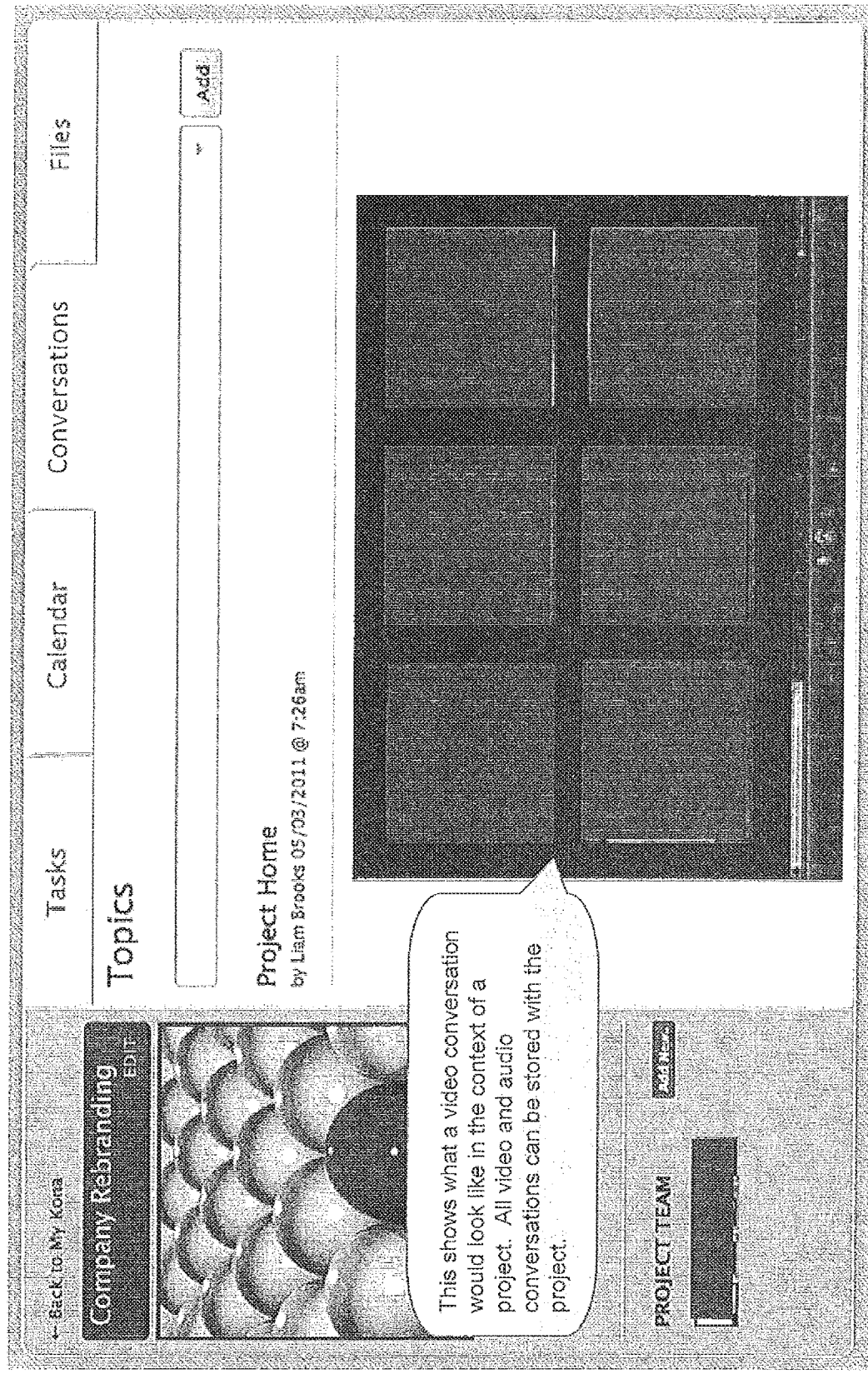
Figure 29:
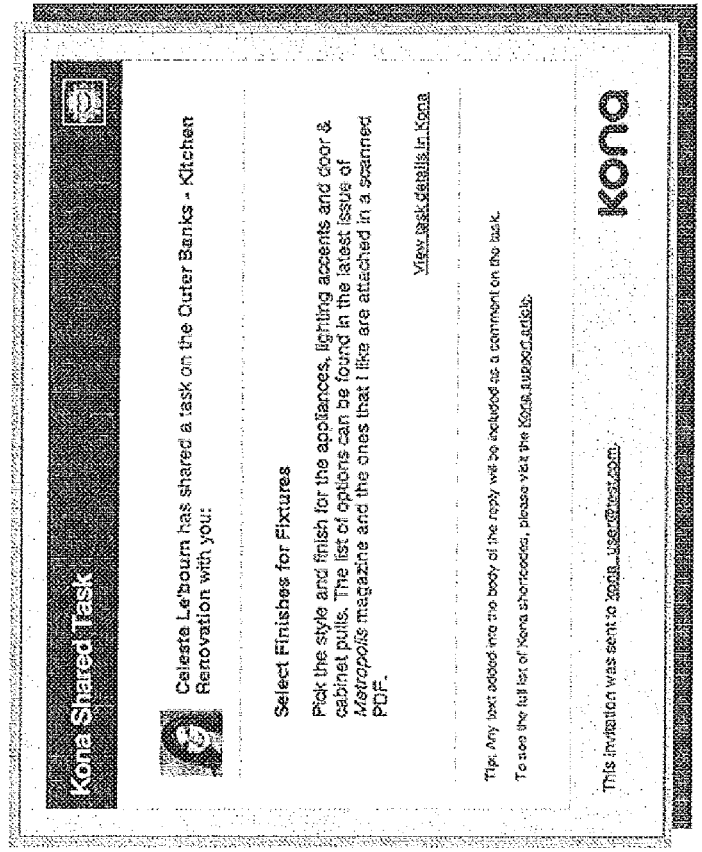

FIGS. 25-29 illustrate various features managed by the conversation manager 145. Team members may have conversations around specific project topics. For example, if a team is working on a fundraiser, and wishes to discuss how to increase the number of volunteers, a user may initiate a conversation entitled "Increase Number of Volunteers". The user may select members of the team, as well as others, to include in the conversation. When members are added to a conversation, they may be notified (e.g., pop-up; alert; email; text, etc.). FIG. 25 illustrates a list of notifications for conversations for which a particular user is invited. FIGS. 25 and 29 also show the interaction in a text conversation. For example, if a team member is on the road and only has access to their mobile device during the conversation, the team member may reply to the conversation by email and their message will become part of the conversation. If a user responds to the notification from within the project management system 103, the user may be taken directly to the conversation. All conversations may be recorded and designated as related to the project.

Figure 26:
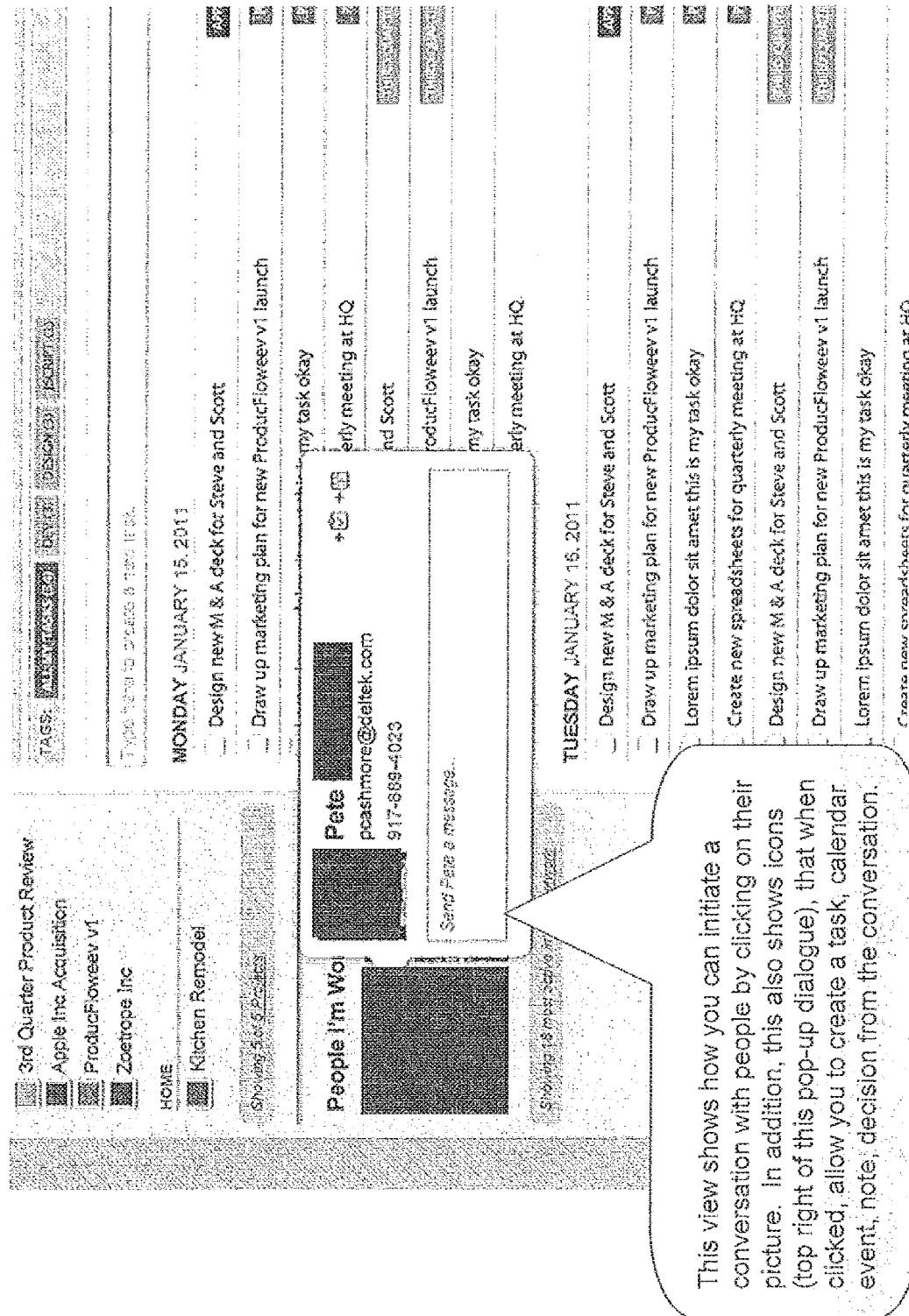

FIG. 26 illustrates how a user may initiate a conversation with a person by clicking on the person's picture. In addition, FIG. 26 illustrates how icons can be clicked to allow a user to comment on a task, calendar event, note, decision, etc. For example, if a user adds a task "Submit Final Edits to Budget", other users may comment on the task. All of the comments may be saved and designated as related to the task and may be searched or viewed at any time. For example, FIG. 27 illustrates how all conversations related to a particular project may be shown.

Users may also have conversations outside of the context of a project. These conversations may be turned into a project conversation at any time. For example, if two people are chatting about the weather and decide to have a discussion about a project, the users may do this.

FIG. 28 illustrates how audio conversations, video conversations, or web conversations (e.g., Web Ex, Joinme, LiveMeeting), or any combination thereof, may be initiated within the context of a project. In this way, documents that are shared during the meeting, as well as documents marked up during the meeting, that are shown during the meeting, may be saved as related to the project. In this way, Web conferences, videos, and marked up files may be saved as a record with the project.

A conversation may be turned into a task, calendar event, note, decision, etc by choosing the relevant option. For example, if a conversation is to be turned into a decision, the user can choose this option, and a decision may be created that includes all of the conversation in its original form. As another example, if several team members are on a video conversation, and decide that there is a follow up action, a user may create a task from the video chat. The conversation will automatically be linked to the task.

In addition, files may be associated with conversations. For example, if users are having a conversation about the budget, a budget spreadsheet may be attached to the conversation.

Users may search for any conversation based upon, for example: participants; date of conversation; text associated with the conversation; tags; associated documents, etc., or any combination thereof.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than those shown.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

It should also be noted that the terms "a", "an", "the", "said", etc. signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method for managing at least one project, comprising:
    storing project templates in at least one project database, wherein the at least one project database contains a sponsored personal project template and a sponsored work project template categorized by type of project, wherein the sponsored personal project template is a sponsored project template sponsored by a third party entity and the sponsored work project template is a sponsored project template sponsored by the third party entity;
    accepting a personal project template and a work project template chosen by at least one user from the at least one project database;
    allowing the at least one user to search, browse and download the personal project template and the work project template;
    accepting at least one start date and/or at least one end date for each project template;
    automatically generating sponsor-related information related to each sponsored personal project template and the sponsored work project template, wherein the sponsor-related information is based upon information related to at least one project currently being done by the at least one user; and
    aggregating the information related to all accepted project templates and allowing at least one user to access the information related to all accepted project templates from at least one user interface;
    wherein the information related to the accepted project templates comprises: at least one calendar event, at least one task, and at least one meeting.

2. The method of claim 1, wherein at least one project template is a non-sponsored project template.

3. The method of claim 1, wherein advertising is generated based upon information related to at least one project that is currently being utilized by at least one user.

4. The method of claim 1, wherein at least one timeline illustrates timeline information related to the project templates.

5. The method of claim 4, wherein the timeline information comprises: tasks, decision points, milestones, calendar events, or meetings, or any combination thereof.

6. The method of claim 1, wherein the project templates are bought utilizing a marketplace hosting sponsored templates and/or non-sponsored templates.

7. The method of claim 1, further comprising:
    organizing at least one meeting related to the project templates.

8. The method of claim 1, wherein the project templates comprise: helpful hints, knowledge, access to experts, predefined tasks, predefined calendar events, predefined files, or dynamic links to third party services and resources, or any combination thereof.

9. The method of claim 1, comprising:
    connecting at least one user to at least one product and/or at least one service related to the project templates using at least one e-commerce widget that allows the at least one user to purchase the at least one product and/or the at least one service.

10. The method of claim 9, wherein the e-commerce widget allows vendors to bid to provide products and/or services, and wherein winners of bids complete a sale using the e-commerce widget.

11. A system for managing at least one project, comprising:
at least one processor device configured for:
storing project templates in at least one project database, wherein the at least one project database contains a sponsored personal project template and a sponsored work project template categorized by type of project, wherein the sponsored personal project template is a sponsored project template sponsored by a third party entity and the sponsored work project template is a sponsored project template sponsored by the third party entity;
accepting a personal project template and a work project template chosen by at least one user from the at least one project database;
allowing the at least one user to search, browse and download the personal project template and the work project template;
accepting at least one start date and/or at least one end date for each project template;
automatically generating sponsor-related information related to each sponsored personal project template and the sponsored work project template, wherein the sponsor-related information is based upon information related to at least one project currently being done by the at least one user; and
aggregating the information related to all accepted project templates and allowing at least one user to access the information related to all accepted project templates from one user interface;
wherein the information related to the accepted project templates comprises: at least one calendar event, at least one task, and at least one meeting.

12. The system of claim 11, wherein at least one project template is a non-sponsored project template.

13. The system of claim 11, wherein advertising is generated based upon information related to at least one project that is currently being utilized by at least one user.

14. The system of claim 11, wherein at least one timeline illustrates timeline information related to the project templates.

15. The system of claim 14, wherein the timeline information comprises: tasks, decision points, milestones, calendar events, or meetings, or any combination thereof.

16. The system of claim 11, wherein the project templates are bought utilizing a marketplace hosting sponsored and/or non-sponsored templates.

17. The system of claim 11, the at least one processor device configured for:
organizing at least one meeting related to the project templates.

18. The system of claim 11, wherein the project templates comprise: helpful hints, knowledge, access to experts, predefined tasks, predefined calendar events, predefined files, or dynamic links to third party services and resources, or any combination thereof.

19. The system of claim 11, the at least one processor device configured for:
connecting at least one user to at least one product and/or at least one service related to the project templates using an e-commerce widget that allows the at least one user to purchase the at least one product and/or the at least one service.

20. The system of claim 19, wherein the e-commerce widget allows vendors to bid to provide products and/or services, and wherein winners of bids complete a sale using the e-commerce widget.

* * * * *